US008477576B2

(12) United States Patent
Onoe

(10) Patent No.: US 8,477,576 B2
(45) Date of Patent: Jul. 2, 2013

(54) OPTICAL DISC APPARATUS

(75) Inventor: Shinsuke Onoe, Fujisawa (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/430,328

(22) Filed: Mar. 26, 2012

(65) Prior Publication Data

US 2012/0250478 A1 Oct. 4, 2012

(30) Foreign Application Priority Data

Mar. 30, 2011 (JP) ................................. 2011-073866

(51) Int. Cl.
*G11B 7/00* (2006.01)

(52) U.S. Cl.
USPC ....................................... 369/44.33; 369/47.5

(58) Field of Classification Search
None
See application file for complete search history.

(56) References Cited

U.S. PATENT DOCUMENTS

2005/0281156 A1 * 12/2005 Watanabe .................. 369/47.11
2007/0242575 A1    10/2007 Nakamura et al.

FOREIGN PATENT DOCUMENTS

| JP | 59-011546   | 1/1984  |
| JP | 06-044587   | 2/1994  |
| JP | 08-030990   | 2/1996  |
| JP | 2001-338425 | 12/2001 |
| JP | 2001-344773 | 12/2001 |
| JP | 2003-173551 | 6/2003  |
| JP | 2008-033978 | 2/2008  |
| JP | 2008-198256 | 8/2008  |

* cited by examiner

*Primary Examiner* — Wayne Young
*Assistant Examiner* — Brian Butcher
(74) *Attorney, Agent, or Firm* — McDermott Will & Emery LLP

(57) ABSTRACT

An optical disc apparatus, for recording or reproducing information by irradiating a laser beam on an optical disc. More particularly, the present application relates to an optical pickup of the optical disc apparatus that produces a tracking error signal, in general, and the optical disc apparatus executes a tracking servo with using the tracking error signal.

8 Claims, 12 Drawing Sheets

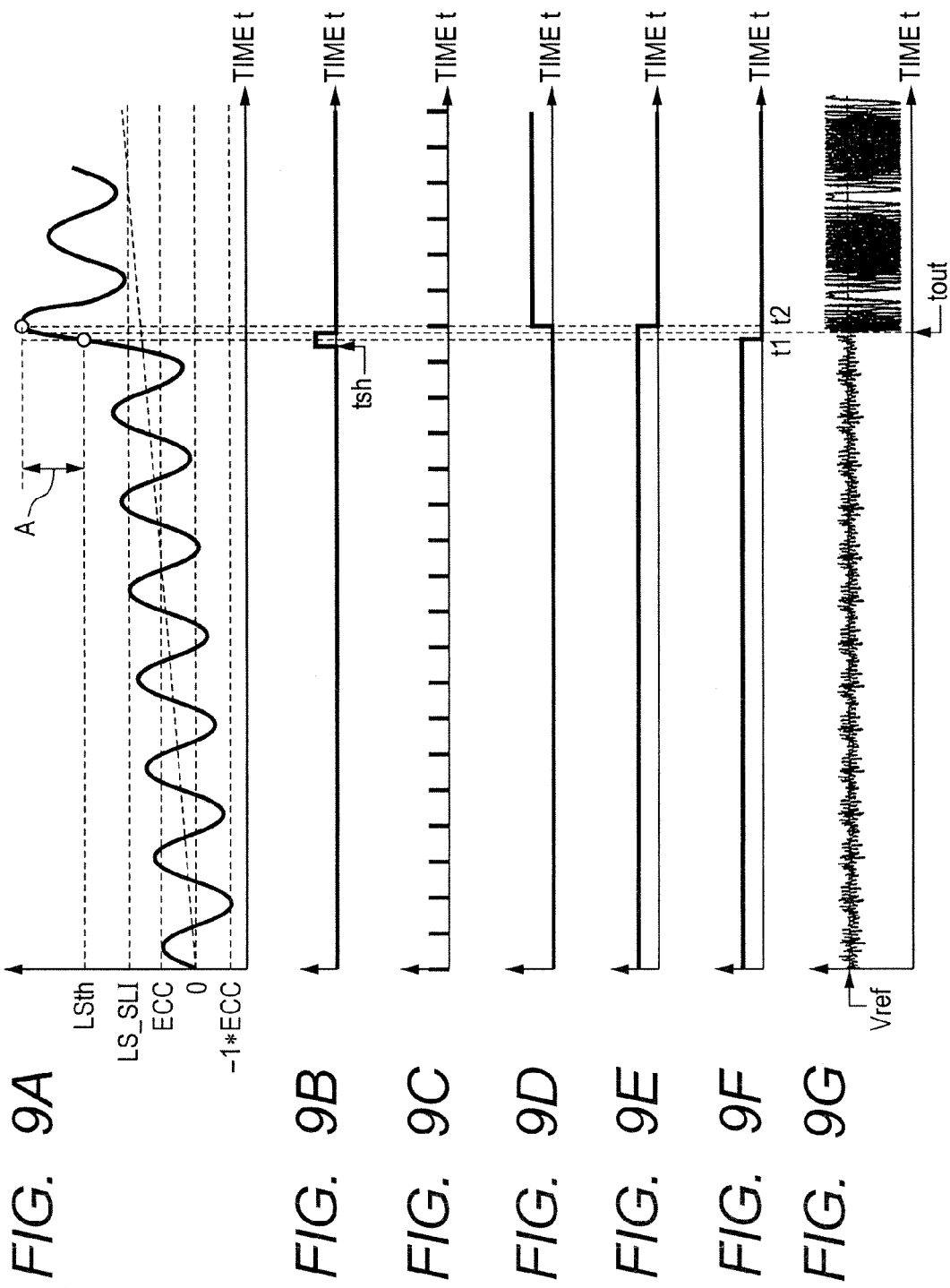

OPTICAL DISC APPARATUS

This application relates to and claims priority from Japanese Patent Application No. 2011-073866 filed on Mar. 30, 2011, the entire disclosure of which is incorporated herein by reference.

BACKGROUND OF THE INVENTION

The present invention relates to an optical disc apparatus.

In recent years, an optical disc apparatus was put into practical use, which can record/reproduce information onto/from an optical disc apparatus. In such optical disc apparatus, there is a problem of tracking out, i.e., an optical beam cannot follow or track the information track. And, within the optical disc apparatus is already known a tracking out detection function, i.e., for detecting that the optical beam cannot follow the information track.

In the following Patent Document 1 is described, in the column 0002 thereof, "Within the conventional optical disc apparatus for exclusive use of readout, the tracking out is detected through observing continuity of the address information, which is read out from the disc. However, when applying this method therein, the recording-type optical disc apparatus takes time from ten and several milliseconds to several tens milliseconds until when it detects that, if the tracking out is generated during the recording operation; i.e., there is a problem of taking a relatively long time, and therefore double-writing is done on the neighboring track."

In the following Patent Document 2 is described, in the column 0018 thereof, "The tracking out detector means has a comparator means for comparing an input signal with a positive threshold value and a negative threshold value to a signal having a predetermined level, when the input signal is larger than the positive threshold value and when it is smaller than the negative threshold value, and a counter for measuring a period, during when the signal having the predetermined level is outputted from the comparator means, for each predetermined time-period, being characterized in that determination is made that the optical beam is in the condition of not following the information track, when the counted value comes up to be larger than a predetermined threshold value, and thereby outputting a tracking out signal."

Also, in the following Patent Document 3 is described, in the column 0022 thereof, "For example, in case where the amplitude of a tracking error signal comes to be narrower than the width between the positive and negative comparison values, as is shown in FIG. 9(A), due to any reason, it is impossible to detect the tracking out at all." Also, in the column 0025 is described, "In this manner, according to the fourth embodiment, it is possible to bring the tracking error signal and the positive and negative comparison values into correct relationships, by creating the tracking out condition through conducting a track jump, and changing the amplitude of the tracking error signal while monitoring the tracing error signal, and therefore it is possible to detect the tracking out, with high accuracy."

In the following Patent Document 4 is described, in the column 0016 thereof, "When the lens shift amount of the objective lens 4a come to be large during the tracking control, as is shown in FIG. 20, an amount of the amplitude of the tracking signal, which can be obtained, comes down to be small."

Further, in the following Patent Document 5 is described, in the column 0034 thereof, "In FIG. 10 are shown estimations of de-track amounts, which are generated in the first and second embodiments, with respect to shift of the objective lens, during when executing the tracking control in accordance with the DPP method. In the first embodiment, there is generated a large de-track accompanying with the shift of the objective lens."

Also, in the columns 0028 and 0029 of the following Patent Document 6 is described, "Also, tracking/offset fluctuates due to the shift of the objective lens 15. This also has characteristics of changing depending on a direction θ of astigmatism. Also, if the optical system in the optical pickup 10 has the astigmatism, there is a tracking/offset changing in relation to the magnitude of this astigmatism and also the magnitude of the lens shifting of the objective lens 15."

In the column 0005 of the following Patent Document 7 is described "(4) comprising an observer circuit, having an actuator for driving the objective lens, which is mounted on the carriage, a lens shift detector means for detecting an amount of shifting of the objective lens as a lens shift signal, a magnetic recording head connected with the carriage, so as to face the objective lens putting the recording medium therebetween, and a window comparator for observing the lens shift signal and detecting the fact that the objective lens exceeds a predetermined shift amount, and (5) being constructed in such a manner that upon the level of the lens shift signal when the objective lens reaches to about 0.3 mm, in relation to (4) mentioned above."

PRIOR ART DOCUMENTS

<Patent Documents>

Patent Document 1: Japanese Patent Laying-Open No. 2001-344773 (2001);

Patent Document 2: Japanese Patent Laying-Open No. 2003-173551 (2003);

Patent Document 3: Japanese Patent Laying-Open No. Hei 8-30990 (1996)

Patent Document 4: Japanese Patent Laying-Open No. 2008-33978 (2008);

Patent Document 5: Japanese Patent Laying-Open No. 2008-198256 (2008);

Patent Document 6: Japanese Patent Laying-Open No. 2001-338425 (2001); and

Patent Document 7: Japanese Patent Laying-Open No. Hei 6-44587 (1994).

BRIEF SUMMARY OF THE INVENTION

An optical pickup of the optical disc apparatus produces a tracking error signal, in general, and the optical disc apparatus executes a tracking servo with using this tracking error signal.

It is well known that an optical pickup of the optical disc apparatus changes balance and amplitude of the tracking error signal due to the lens shifting. In the present specification, this is called "visual field characteristics".

Herein, explanation will be given on definitions of the amplitude and the balance of the tracking error signal, in the present specification, by referring to FIGS. 11A to 11C. FIG. 11A shows therein a one (1) cycle of the tracking error signal when the lens shifting is zero (0), and FIG. 11B one (1) cycle of the tracking error signal when the lens shifting occurs, respectively. If assuming that the amplitude between both ends of the tracking error signal is "H0" when the lens shifting is and zero (0), and the amplitude between both ends of the tracking error signal is "H1" when the lens shifting occurs, then the amplitude of the tracking error signal is defined by the following equation:

$$\text{Amplitude} = (H1/H0) \times 100 [\%]$$

As is apparent from this, the amplitude of the tracking signal is 100% when the lens shifting is zero (0).

Following to the above, explanation will be given on the definition of the balance of the tracking error signal, in the present specification. FIG. 11C shows therein a one (1) cycle of the tracking error signal when a central level "Vc" of the amplitude of the tracking error signal is not consistent with a reference electric potential "Vref". In this instance, the balance is defined by the following equation, with using the amplitude "A" of portion, in which the tracking error signal is equal to or larger than the reference electric potential "Vref", and the amplitude "B" of portion, in which the tracking error signal is equal to or smaller than the reference electric potential "Vref":

$$\text{Balance}=[(A-B)/2(A+B)]\times 100[\%]$$

Also, in the present specification, the amplitude "A" mentioned above will be called, a "upper-side amplitude", and the amplitude "B" mentioned above will be called, a "lower-side amplitude", respectively.

As is apparent from those, when the central level "Vc" of the amplitude of the tracking error signal is consistent with the reference electric potential "Vref", the balance of the tracking error signal is 0%. In this manner, "the amplitude is 100% and the balance is 0%" in an ideal or optimal condition. Also, the fact that change from the condition of "the amplitude is 100% and the balance is 0%" is large will be called, "deterioration of the balance is large".

Explanation will be given on the view field characteristics, by referring to FIGS. 10A and 10B. FIG. 10A shows the change of the amplitude of the tracking error signal due to the lens shifting, and FIG. 10B the change of the balance of the tracking error signal due to the lens shifting.

As can be seen from FIGS. 10A and 10B, the tracking error signal when the lens shifting occurs is decreased in the amplitude thereof, and at the same time, is deteriorated in the balance thereof.

However, the de-track amount in the Patent Document 5 comes to the characteristics obtained by multiplying an amplitude characteristic of the tracking error signal and the balance characteristic. Since the amplitude characteristic of the tracking error signal has a shape of being gradually decreased by lens shifting, then the de-track amount and the balance of the tracking error signal comes to similar to each other in the shapes thereof.

The inventors of the present invention found out that there is a problem to be dissolved when the lens shifting is generated, in the optical disc apparatus according to the conventional technology. As the problem when the lens shifting is generated, for example, there is a problem relating to the view field characteristics mentioned above. Thus, the inventors of the present invention found out that the tracking error detecting function cannot detect the tracking out, normally, in the optical disc apparatus applying an optical pickup having such view field characteristics as shown in FIGS. 10A and 10B. Hereinafter, explanation will be given on this problem.

First of all, as a general method for detecting the tracking out can be considered the method disclosed in the Patent Document 2 mentioned above. This is a method of detecting the tracking out when the time-period, during which an absolute value of the amplitude of the tracking error signal comes to be equal to or greater than a predetermined voltage, elapses exceeding a predetermined time-period.

FIGS. 12A to 12D are views for explaining the method for detecting the tracking out, which is described in the Patent Document 2 mentioned above. FIG. 12A shows a tracking error signal, FIG. 12B a signal indicating that the amplitude becomes large, FIG. 12C a counter output for measuring a time length during when the amplitude is large, and FIG. 12D a detection signal of tracking out, respectively.

The detection of tracking out described in the Patent Document 2 mentioned above says as follows. Upon detection of that tracking out, there are provided a positive threshold value TH1 and a negative threshold value TH2 with respect to the tracking error signal. Herein, for easiness, it is assumed that absolute values of TE1 and TE2 are same. The tracking error signal is compared with the positive threshold value TH1 and the negative threshold value TH2, and when that signal is larger than the positive threshold value TH1 or is smaller than the negative threshold value TH2, a signal becoming "High" is produced (see a waveform in FIG. 12B). Next, only the time-period when the waveform in FIG. 12B is "High", measurement is made on a length of the time-period during when the amplitude is large, with provision of a counter for incrementing at a predetermined cycle (in FIG. 12C). The counter is reset at every time-period T, and thereby calculates the length of the time-period during when the amplitude is large within the predetermined time-period T. An output of this counter is compared with a threshold value TH3, and when the length of the time-period (e.g., an output value of the counter) during when the amplitude is large within a previous measuring period T is larger than the threshold value TH3, the tracking out signal (in FIG. 12D) come to "High".

Herein, in the view field characteristics shown in FIGS. 10A and 10B, the problem will be explained, by taking the condition where the lens shifting is −300 μm, as an example. Under the condition where the lens shifting is −300 μm, as is shown in FIGS. 10A and 103, the amplitude of the tracking error is lowered down to 70%. Further, the balance of the tracking error signal comes down to −20%. As a result of this, the amplitude of the tracking error signal is in the condition as shown in FIG. 13A.

FIG. 13A shows one (1) cycle of the tracking error signal under the condition that the lens shifting is −300 μm, while FIG. 133 shows one (1) cycle of the tracking error signal under the condition that the lens shifting is zero (0). The amplitude on one side when the lens shifting is zero (0) is described by H0.

Thus, when assuming that the amplitude on one side is 100% when the lens shifting is zero (0), then the amplitude on an upper side is 42% while the amplitude on a lower side is 98%, under the condition that the lens shifting is −300 μm. FIGS. 14A to 14C are waveform views for explaining the case of the tracking out occurs under such condition. A time "tout" is the time-point when the tracking out occurs.

FIG. 14A shows the case when the tracking out occurs under the condition where the lens shifting is zero (0), for the purpose of comparison. FIG. 14 B shows the case where the tracking error occurs after the tracking error signal shifts into a direction of changing to a positive under the condition that the lens shifting is 300 μm, from the condition that a tracking servo is taken, on the other hand, FIG. 14C shows the case where the tracking out occurs after the tracking error signal shifts into a direction of changing to a negative under the condition that the lens shifting is 300 μm.

When applying the method for detecting the tracking out mentioned above into the tracking error signal, in case of FIG. 14B, since the amplitude on the lower side of the tracking signal has the amplitude of 98% during when the track is shifted by a half (½) of track distance after the tracking out (i.e., a time-period shown by "T1_b"), it is possible to detect the tracking out, normally, during the time-period "T1_b".

On the other hand, in case of FIG. 14C, the tracking error signal has only the amplitude of 42% on the lower side thereof during when the track shifts by a half (½) of the track distance after the tracking out (i.e., a time-period shown by "T1_c"). For detecting this, it is necessary to lower down the threshold value provided for detecting the tracking out, however if lowering it too much, it brings about an error detection, i.e., detecting it as the tracking out, even if the tracking out does not occur. For that reason, it is impossible to determine such a threshold value that the tracking out can be detected even in the case where the amplitude on the lower side decreases down to 42%. Accordingly, it is impossible to detect the tracking out during the period"T1_c". After shifting a half (½) of the track distance after the tracking out occurs, firstly the tracking out can be detected, during the time when it shifts to 1 time of the track distance (i.e., a time-period shown by "T2_c").

Herein, a point A in FIG. 14C shows a track, along which the optical head follows just before the tracking out occurs, and a point B is a track neighboring with it in the direction of the tracking out. When considering the tracking out detection on the recording-type optical disc apparatus, even if detecting the tracking error at first in the time-period shown by "T2_c", the optical pickup comes across the neighboring track under the condition of emitting the recording light. In case where the neighboring track is already recorded, that data may be written in duplicate, and there is a possibility of destroying it, therefore there is a problem.

Further, when the balance of the tracking error signal is bad, there is a tendency that the tracking out can occur easily, on the side on which the balance is broken. This is because the distance up to the end of a negative feedback region is short, and therefore it can easily reach to an incontrollable condition even with a smaller external disturbance. Thus, between FIGS. 14B and 14C, the tracking out can easily occur under the condition of FIG. 14C. For that reason, with the optical pickup having a large deterioration in the view field characteristics, this tracking out detection comes up to be a large problem.

In this manner, with the optical disc apparatus applying the optical pickup having the view field characteristics, being large in the deterioration thereof, the tracking out detecting function comes to be unable to detect the tracking error, normally.

If dissolving this problem, even the optical pickup having the view field characteristics, being large in the deterioration thereof, it is possible to provide an optical disc apparatus improved in the reliability thereof, without destroying the data on the neighboring track even when the tracking out occurs due to external vibrations, etc.

As was mentioned in the Patent Document 6, since the view field characteristics are due to astigmatism and/or spherical aberration, conventionally, deterioration of the view field characteristics the optical pickup is suppressed by providing an element for correcting the aberration, etc.

However, in recent years, demand for cost reduction of the optical pickup is large, and a technology is required for applying a cheap optical pickup. For this reason, if it is possible to detect the tracking out for the optical pickup having the deterioration in the view field characteristics thereof, it is possible to achieve a cheap optical pickup, and as a result a cheap optical disc apparatus.

In general, on the optical disc drive, the optical disc rotates having eccentricity, onto/from the optical disc having such eccentricity is conducted an operation, such as, recording and/or reproducing of information, for example.

For example, when the tracking out occurs during when the optical pickup follows the track while taking the tracking servo on the optical disc having the eccentricity of 300 μm, behavior of the tracking out differs from depending on the rotation angle of the disc. Thus, when occurring at a rotation angle, at which the lens shifting is zero (0), it has such a waveform as shown in FIG. 14A, and when occurring at a rotation angle, at which the eccentricity is the maximum, it has such a waveform as shown in FIG. 14B or 14C. It has a characteristic that it changes the behavior during one (1) rotation thereof, depending on the rotation angle, at which the tracking out occurs.

For that reason, if trying to detect the amplitude of the tracking error, correctly, correcting it with applying the technology disclosed in the Patent Document 3 mentioned above, there occurs necessity of conducting a tracking jump by a plural numbers while designating the rotation angle thereof, and there is a problem of extending the time for adjustment.

Also, in the Patent Document 7 mentioned above is only disclosed the problem, that the fluctuation occurs in an offset of the tracking signal accompanying with the lens shifting, no consideration is paid on the problem that the tracking error signal is deteriorated in the balance thereof, at the same time, the amplitude thereof is reduced, when the lens shifting occurs. Namely, no consideration is paid on the problem that it is difficult to make a normal tracking out detection, if the balance of the tracking error signal is deteriorated accompanying with the lens shifting. Furthermore, in the Patent Document 7 mentioned above, since it has the structure "of stopping driving of the light source of the magnetic recording head, upon the level of the lens shift signal at the time-pint when the shift amount of the objective lens reaches to about 0.3 mm", as was mentioned above, it is necessary to conduct a drive starting process for the light source, etc., again, when starting the recording operation, again; there is a problem of taking a time. An object of the present invention is to improve the reliability of the optical disc apparatus. And, it is also an object to provide a cheap disc apparatus.

For accomplishing the objects mentioned above, as an example of the present invention, there is provided the optical disc apparatus as is described in the following pending claims.

According to the present invention, it is possible to provide the optical apparatus improving the reliability thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIGS. 9A to 9G are views for showing signal waveforms for explaining an effect of the embodiment 2;

DETAILED DESCRIPTION OF THE PREFERRED EMBODIMENTS

Hereinafter, embodiments according to the present invention will be fully explained by referring to the attached drawings.

Explanation will be given on an embodiment 1 according to the present invention, hereinafter.

Figure 1:
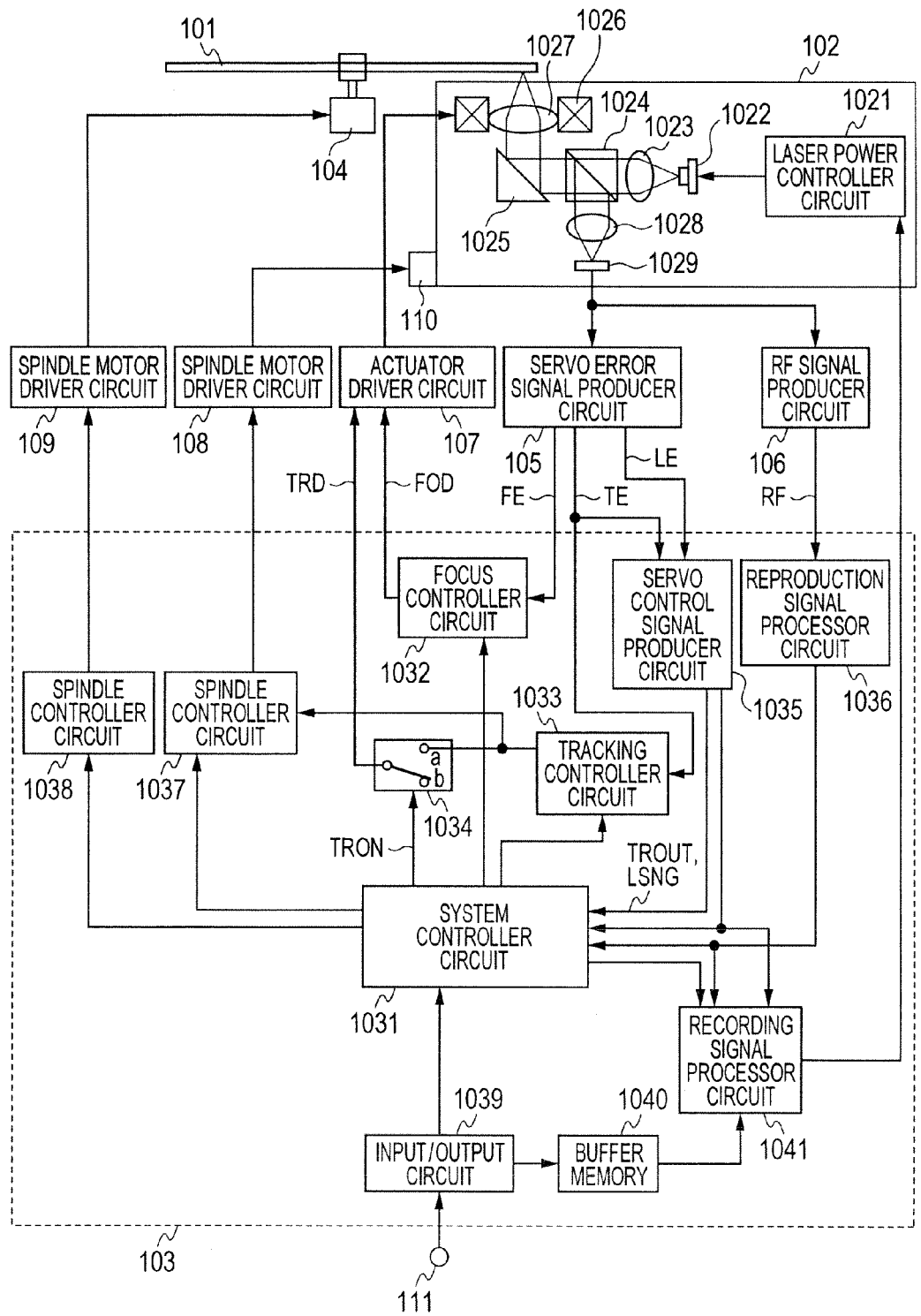
FIG. 1 is a block diagram for showing the structure of an optical disc apparatus according to an embodiment 1 of the present invention.

FIG. 1 is a block diagram for showing the configuration of the optical disc apparatus, according to the present embodiment.

A signal processor circuit 103 is a circuit for conducting signal processing of various kinds of signals of the optical disc apparatus, and operates upon basis of electric potential "Vref".

An optical disc 101 is rotated at a predetermined rotation speed, through driving of a spindle motor 104 by a spindle motor driver circuit 109, base on a control signal outputted from a spindle controller circuit 1038, which receives an instruction signal from a system controller circuit 1031 mounted on a signal processor circuit 103.

A laser light source 1022 emits a laser beam at a predetermined power through a laser power controller circuit 1021, which is mounted on a pickup 102. A light emission power of the laser light source 1022 when reproducing information will be called "reproducing power", while the light emission power of the laser light source 1022 when recording information will be called "recording power". The recording power has a power larger than the reproducing power.

The laser beam emitted from the laser light source 1022 is condensed or focused as a light spot on an information recording surface of the optical disc 101, passing through a collimate lens 1023, a beam splitter 1024, a reflecting mirror 1025 and an objective lens 1027. The light reflecting on the information recording surface of the optical disc 101 is separated by the beam splitter 1024, and is condensed on a photo detector 1029 by a condenser lens 1028. The photo detector 1029 converts the light condensed thereon into an electric signal, and output it to a servo error signal producer circuit 105 and a RF signal producer circuit 106.

The servo error signal producer circuit 105 produces a focus error signal (herein after, "a FE signal") to be used for focusing control, a tracking error signal (hereinafter, "a TE signal") to be used for tracking control, and a lens error signal (hereinafter, "a LE signal") indicating a shift (i.e., the lens shift) of the objective lens 1027 from a neutral position thereof, to be outputted therefrom. However, in the present embodiment, the LE signal shows a polarity of positive voltage when the objective lens 1027 is shifted to an outside periphery, while it shows a negative voltage when the objective lens 1027 is shifted to an inside periphery thereof. Also, it is assumed that each error signal is outputted upon basis of an electric potential "Vref".

Also, the RF signal producer circuit 106 conducts an equalizing process upon an electric signal detected on the photo detector 1029, so as to output it as the RF signal.

A focus controller circuit 1032 outputs a focus driving signal FOD upon basis of the focus error signal FE, in accordance with an instruction signal of the system controller circuit 1031.

An actuator driver circuit 107 drives an actuator 1026, which is constructed to operate with the objective lens 1027 in one body in accordance with a focus driving signal FOD, in the direction perpendicular to the disc surface. As was mentioned above, with the operations of the focus controller circuit 1032 and the actuator driver circuit 107, the focusing control is executed in such a manner that the optical spot irradiated on the optical disc 101 is always condensed or focused on the information recording surface of the optical disc 101.

When the focusing control operates so that the optical spot is focused on the information recording surface of the optical disc 101, the servo error signal producer circuit 105 outputs the tracking error signal TE for indicating the position shift between the optical spot and a track on the information recording surface. Further, the servo error signal producer circuit 105 outputs the lens error signal LE for indicating an amount of lens shifting of the objective lens 1027.

A tracking controller circuit 1033 outputs a signal for driving the objective lens 1027 in a radial direction of the disc, so that the optical spot irradiated on the optical disc 101 follows the track on the information recording surface, upon basis of the tracking error signal TE, in accordance with the instruction signal from the system controller circuit 1031. The signal outputted from the tracking controller circuit 1033 is inputted into the actuator driver circuit 107 through a switch 1034.

The switch 1034 selects the output signal from the tracking controller circuit 1033 or the reference potential "Vref", upon basis of a TRON signal, which the system controller 1031 outputs, and outputs it as a tracking drive signal TRD. When a "High level" is inputted as the TRON signal, the switch 1034 selects a terminal "a", so that an output signal of the tracking controller circuit 1033 is outputted to the actuator. On the other hand, when a "Low level" is inputted as the TRON signal, the switch 1034 selects a terminal "b", so as to output the reference potential "Vref".

As a result of this, the TRON signal functions as a signal instructing ON/OFF for the tracking servo. Also, the switch 1034 functions as a switch for exchanging the tracking servo between ON and OFF. When the TRON signal is changed from "Low" to "High", the output signal of the tracking controller circuit 1033 is supplied to the actuator by the switch 1034. With doing this, the tracking servo is turned into "ON", and this operation is called "a track pull-in operation".

The actuator driver circuit 107 drives the actuator 1026 in the direction in parallel with the disc surface in accordance with the tracking drive signal TRD, and therefore the objective lens 1027 is driven in the radial direction of the disc. With driving the actuator upon basis of the output signal from the tracking controller circuit 1033, the optical spot follows the track on the information recording surface. In this manner, the actuator driver circuit 107 in the present embodiments includes therein both, a circuit for driving the optical spot in the focusing direction and a circuit for driving it in the tracking direction.

A servo controlling signal producer circuit 1035 produces various kinds of outputs, with inputting the TE signal and the LE signal, which are outputted by the servo error signal producer circuit 105. The servo controlling signal producer circuit 1035 in the present embodiment produces a tracking out detection signal TROUT and a LSNG signal, to be outputted therefrom. The TROUT signal and the LSNG signal are inputted to the system controller circuit 1031.

A reproduce signal processor circuit 1036 conducts a demodulating process upon the RE signal outputted by the RF signal producer circuit 106, and outputs information (including present address information), which is read out from the optical disc 101, to the system controller circuit 1031 and a recording signal processor circuit 1041.

Also a slider controller circuit 1037 outputs a slider driving signal for driving a slider motor 110, upon basis of an averaged value of output signals of the tracking controller circuit 1033, when receiving an instruction signal from the system controller circuit 1031. With driving of the slider motor 110 by the slider motor driver circuit 108 in accordance with this slider driving signal, the optical pickup 102 is shifted in the radial direction of the disc, so that the objective lens 1027 can operate in the vicinity of the neutral position thereof, where the lend sifting is zero (0), always, even if continuing to follow the track.

Further, in a seek operation of driving the optical pickup 102 to the positions different in the radius on the optical disc 101, upon receipt of an instruction signal of the seek operation, the slider controller circuit 1037 outputs a slider driving signal, and in accordance with this slider driving signal, the slider motor driver circuit 108 drives the slider motor 110; thereby conducting the seek operation. However, in the seek operation, the control is executed with using the address information, which can be obtained in the reproduce signal processor circuit 1036.

Also, an input/output circuit 1039 controls data transmission conducted between the optical disc apparatus and a to host apparatus, such as, a personal computer, etc., not shown in the figure, through a terminal 111. The input/output circuit 1039 transmits command content from the host apparatus to the system controller circuit 1031, and also transmits data to be transmitted from the host apparatus to a buffer memory 1040.

The buffer memory 1040 stores recording data, which is supplied from the host apparatus through the input/output circuit 1039 and the terminal 111 when recording the data, temporarily.

A recoding signal processor circuit 1041 when recording data reads out a predetermined amount of data from the buffer memory 1040, upon basis of an indication signal from the system controller circuit 1031, and produces a recording signal through conducting thereon an error correction code addition, an encoding process and a modulating process, etc., thereby outputting it after conversion into a laser light emitting pulse train.

The signal outputted from the recoding signal processor circuit 1041 is inputted into the laser power controller circuit 1021, and the laser light source 1022 emits the light at the recording power. In that instance, the recoding signal processor circuit 1041 executes such a control that the data is recorded through emitting a light for recording in synchronism with an address position where the recording should be done, upon basis of the address information inputted from the reproduce signal processor circuit 1036.

Further, the recoding signal processor circuit 1041 is in such structure that an interruption is enters therein by the TROUT signal. When the interruption enters by the TROUT signal, it stops the light emission at the recording power by sending out a signal to the laser power controller circuit 1021, instantaneously, and change the light emission at the reproducing power.

Also, the recoding signal processor circuit 1041 when reproducing data outputs an instruction signal to the laser power controller circuit 1021, so that it conducts the light emission at the reproducing power, upon basis of the instruction signal from the system controller circuit 1031.

As the instruction signal from the system controller circuit 1031 to the recoding signal processor circuit 1041 may be a start of emission of the reproducing light or a stop of emission of the reproducing light, a start of emission of the recording light or a stop of emission of the reproducing light, and/or an instruction of adjustment of power of the recording light emission, etc.

Also, in general, on the optical disc is defined a minimum unit for recording by a regulation. In the present specification, this will be called "a minimum recording unit". In case of Blue-ray Disc, for example, the minimum recording unit is one (1) cluster. Hereinafter, for the purpose of explanation, it is assumed that the optical disc 101 is the Blue-ray Disc, and the explanation will be given upon assumption that the minimum recording unit is one (1) cluster.

Accordingly, when recording the data explained in the above, the recording is conducted upon the data for each minimum recording unit, or the data putting plural numbers of the minimum recording units together.

Figure 2:
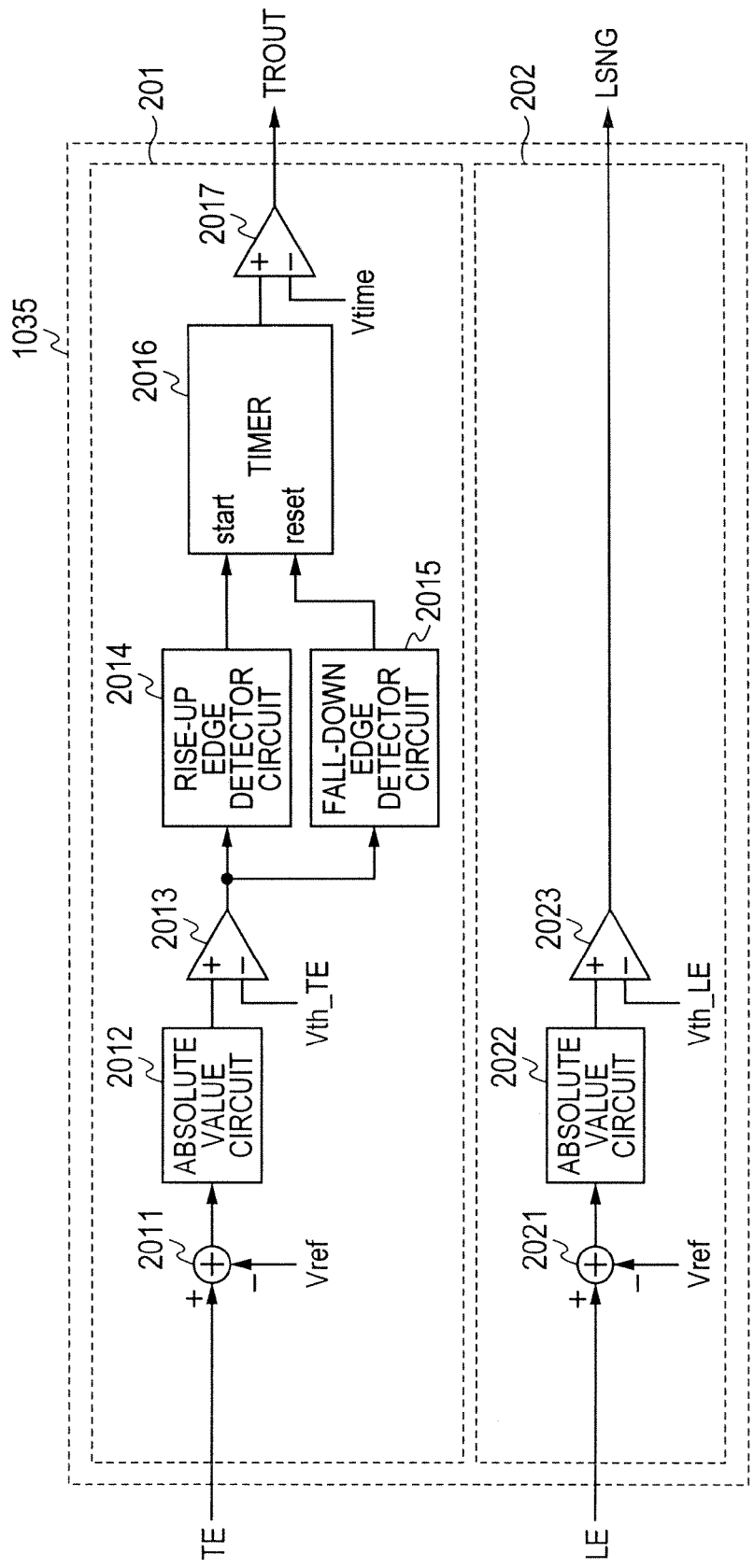
FIG. 2 is a block diagram for showing the structure of a servo control signal producer circuit 1035 of the embodiment 1.

Next, explanation will be made on the configuration of the servo control signal producer circuit 1035 in such the optical disc apparatus, by referring to FIG. 2.

The servo control signal producer circuit 1035, inputting the TE signal and the LE signal therein, produces the TROUT signal and the LSOK signal to be outputted. The servo control signal producer circuit 1035 is constructed with a tracking out detector circuit 201 and a lens shifting amount determine circuit 202.

The tracking out detector circuit 201 is constructed with so a subtractor 2011, an absolute value circuit 2012, a comparator 2013, a rise-up edge detector circuit 2014, a fall-down edge detector circuit 2015, a timer 2016 and a comparator 2017. The tracking out detector circuit 201 inputs the TE signal therein and outputs the tracking out detection signal TROUT therefrom.

The subtractor 2011 outputs the difference between the TE signal and the reference level "Vref", which are inputs into the tracking out detector circuit 201.

The absolute value circuit 2012 outputs a signal obtained by taking an absolute value upon the output signal of the subtractor 2011.

The comparator 2013 compares the output signal of the absolute value circuit 2012 with a predetermined threshold value "Vth_TE" to determine of being larger or smaller.

The rise-up edge detector circuit 2014 detects a rise-up edge of the output signal of the comparator 2013.

The fall-down edge detector circuit 2015 detects a fall-down edge of the output signal of the comparator 2013.

The rise-up edge detector circuit 2014 and the fall-down detector circuit 2015 do an operation, i.e., outputting the "High level" for a predetermined time-period after detecting the edge, and thereafter turning back to the "Low level".

The timer 2016 is a timer having two (2) inputs and one (1) output, wherein the inputs include a signal for starting a timer measurement and a single for resetting the timer. The timer 2016 starts the timer measurement when the output signal of the rise-up edge detector circuit 2014 comes up to be "High level", while resets the time when the output signal of the fall-down edge detector circuit 2015 comes up to be "High level". Also, it outputs a voltage level in relation with a value of the timer as an output thereof.

The comparator 2017 compares the output signal of the timer 2016 with a predetermined threshold value "Vtime" to determine of being larger or smaller, so as to output it as the TROUT signal therefrom.

The lens shifting amount determine circuit 202 is constructed with a subtractor 2021, an absolute value circuit 2022 and a comparator 2023. The lens shifting amount determine circuit 202 inputs the LE signal therein, and outputs the LSNG signal therefrom.

The subtractor 2021 outputs the difference between the LE signal and the reference level "Vref", which are the inputs of the lens shifting amount determine circuit 202.

The absolute value circuit 2022 outputs a signal obtained, by taking an absolute value upon the output signal of the subtractor 2021.

The comparator 2023 compares the output signal of the absolute value circuit 2022 with a predetermined threshold value "Vth_LE" to determine of being larger or smaller, and outputs it as the LSNG signal therefrom.

Next, explanation will be given on the operation of the tracking out detector circuit 201, by referring to FIGS. 3A to 3H.

Figure 3A:
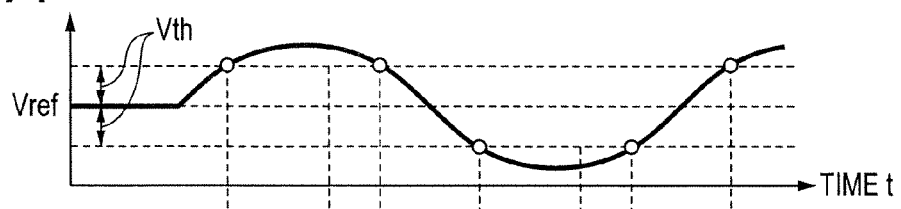
FIGS. 3A to 3H are views for showing signal waveforms for explaining an operation of a tracking out detector circuit 201 of the embodiment 1.
Figure 3B:
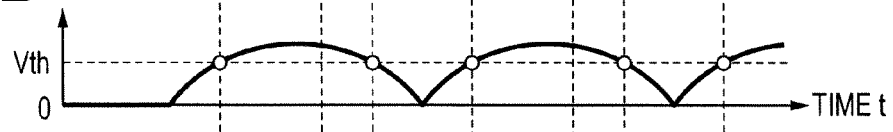
Figure 3C:
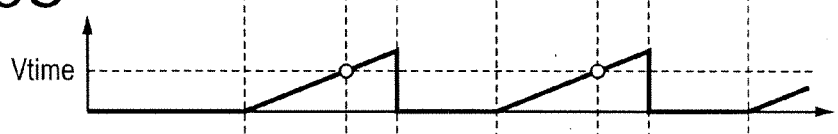
Figure 3D:

FIG. 3A shows the TE signal, which is the input signal of the tracking out detector circuit 201, FIG. 3B the output signal of the absolute value circuit 2012, FIG. 3C the output signal of the timer 2016, and FIG. 3D the TROUT signal, respectively. Those FIGS. 3A to 3D show the signal waveforms at various portions when the tracking out occurs, for the explanation, wherein the TE signal shown in FIG. 3A has a sinusoidal waveform.

When the output signal of the absolute value circuit 2012 exceeds the threshold value "Vth_TE" at a time t=t1, detection of this is made by the rise-up edge detector circuit 2014, and the measurement of the timer 2016 is started.

When the signal vale of the timer 2016 exceeds the threshold value "Vtimer" at a time t=t2, the TROUT signal, which is the output signal of the comparator 2017, turns to the "High level". Herein, it is assumed that the time-period from the time t1 to t2 be "ΔTout".

When the output signal of the absolute value circuit 2012 lowers the predetermined threshold value "Vth", detection of this is made by the fall-down edge detector circuit 2015, and the measurement of the timer 2016 is reset. As a result of this, the TROUT signal, which is the output signal of the comparator 2017, turns to the "High" when detecting the tracking out.

In the detection of the tracking out, in the present embodiment, it is detected that the tracking out occurs upon the fact that the time-period, during when the absolute value of fluctuation or changing of the TE signal exceeds the predetermined threshold value "Vth_TE", is longer than the "ΔTout". Also, the TROUT signal outputted by the tracking out detector circuit 201 is a signal turning into the "High" when the tracking out is detected.

Figure 3E:
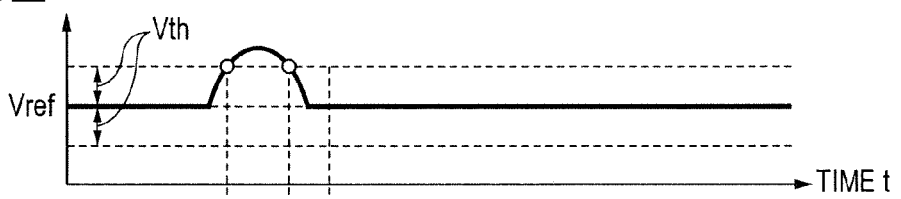

On the other hand, FIGS. 3E to 3H show the waveforms at the various parts when although the tracking error of the tracking servo comes to be large but it does not reach to the tracking out, wherein the TE signal shown in FIG. 3E is large in the amplitude from the "Vref", in general.

Figure 3F:
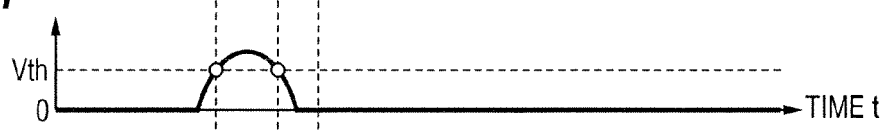
Figure 3G:
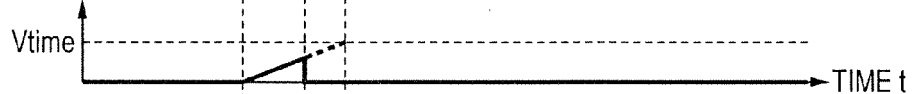
Figure 3H:
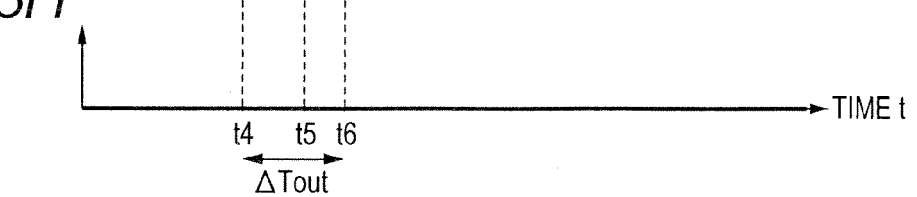

In the case shown in those figures, since the time-period from the time when the absolute value of the fluctuation of the TE signal exceeds the predetermined threshold value "Vth_TE" (time t4) to the time when it lowers than that (time t5) is shorter than the "ΔTout", the output signal shown in FIG. 3F of the timer 2016 does not exceeds the predetermined threshold value "Vtime", and then the TROUT signal shown in FIG. 3H, which is the output signal of the comparator 2017, never comes up to the "High level". For this reason, it is not detected as the tracking out.

Also, the LSNG signal outputted by the lens shifting amount determine circuit 202 is a signal to be the "High" when the absolute value of the fluctuation of the LE signal exceeds the predetermined threshold value "Vth_LE". This is apparent from the fact that the structure of the lens shifting amount determine circuit 202 is similar to that of the tracking out detector circuit 201.

The determination of the lens shifting amount in the present embodiment is made in such a manner, that the lens shifting amount is large upon the fact that the absolute value of the fluctuation of the LE signal exceeds the predetermined threshold value "Vth_LE". Also, the LSNG signal outputted by the lens shifting amount determine circuit 202 is a signal to come up to the "High" when the lens shifting amount is determined to be large.

Next, explanation will be made on a recording process of data in the present embodiment, by referring to the flowchart shown in FIG. 4.

When the optical disc apparatus starts the recording process of data upon receipt of a command from the host apparatus (step S401), the system controller circuit 1031 sends out an indication to the recoding signal processor circuit 1041, so as to conduct an adjustment of the recording power (step S402). This adjustment of the recording power is called "OPC".

When the adjustment of the recording power is completed, the system controller circuit 1031 conducts seeking to an address just in front of the recording start address, and then it conducts an operation of following the track thereafter (step S403). The operation of following the track means an operation of continuing to follow the track after completing the seeking, for example. Since the track on the recording surface of the optical disc has a spiral structure directing from an inner periphery to an outer periphery, if continuing the operation of following the track, the address following thereto is also changed. Also, the system controller circuit 1031 sends out an indication to start the recording to the recoding signal processor circuit 1041 (but omitted in the flowchart).

Following to the above, the recoding signal processor circuit 1041 determines if the address reaches to the recording start address or not, from the address information obtainable from the reproduce signal processor circuit 1036 (step S404). If it does not reach to the recording start address (in case of "No" in the step S404), the process turns back to the step S404. Thus, it is an operation of waiting until when the address reaches to the recording start address.

When it reaches to the recording start address (in case of "Yes" in the step S404), the recoding signal processor circuit 1041 starts the light emission for recording, so as to start the recording of data (step S405).

After starting the recording operation, the system controller circuit 1031 determines if the level of the TROUT signal is "Low" or not (step S406).

When the TROUT signal is "High" (in case of "No" in the step S406), the system controller circuit 1031 completes the recording process of data.

Herein, the TROUT signal was "High" means that the tracking out detector circuit 201 detects the tracking out. In this case, the interruption enters into the recoding signal processor circuit 1041, so that the light emission for recording is stopped. For that reason, the operation is as follow: i.e., while reporting a failure of recording to the host apparatus, the recording process of data is ended.

When the TROUT signal is "Low" (in case of "Yes" in the step S406), the system controller circuit 1031 determines if the level of the LSNG signal is "Low" or not (step S408).

When the LSNG signal is "Low" (in case of "Yes" in the step SD408), the system controller circuit 1031 determines if the address reaches to a recording end address or not (step S409).

When the address reaches to the recording end address (in case of "Yes" in the step S409) the system controller circuit 1031 sends out an indication to the recoding signal processor circuit 1041, to stop the light emission for recording (step S414). Thus, it stops the light emission at the recording power and change the light emission at the reproducing power.

On the other hand, the address does not reach to the recording end address (in case of "No" in the step S409), the process tunes back to the step S406, i.e., continuing the recording operation of data. For this reason, when both the TROUT signal and the LSNG signal are always "Low level", recording of data is continued from the recording start address to the recording end address, i.e., the recording operation of data of the optical disc apparatus, in general. However, in the flowchart is omitted the operation of the recoding signal processor circuit 1041, i.e., reading out a predetermined amount of data from the buffer memory 1040, so as to produce a recording signal by conducting the adding of error correction code, the encoding process, the modulating process, etc., and converting it into the laser light emitting pulse train to be outputted.

When the LSNG signal is "High" (in case of "No" in the step S408) in the step S408, the system controller circuit 1031 memorizes a cluster position, which was recorded when the LSNG signal was "High" (step S411).

Following to the above, the system controller circuit 1031 determines if the recording until a terminal end of the cluster memorized in the step S411 is completed or not, from the address information, which can be obtained from the reproduce signal processor circuit 1036 (step S412). If the recording until the terminal end of the cluster memorized is not completed (in case of "No" in the step S412), it turns back to the step S412 and waits until when the recording is completed up to the terminal end of the cluster memorized.

When the recording is completed up to the terminal end of the cluster memorized (in case of "Yes" in the step S412), the system controller circuit 1031 sends out an indication to the recoding signal processor circuit 1041, so as to stop the light emission for recording (step S413). Thus, the light emission at the recording power is changed into the light emission at the reproducing power.

After stopping the light emission for recording, the system controller circuit 1031 determines if the level of the LSNG signal is "Low" or not (step S414). If the level of the LSNG signal is "High" (in case of "Yes" in the step S414), it turns back to the step S414 and waits until when the level of the LSNG signal turns into "Low".

When the level of the LSNG signal is "Low" (in case of "Yes" in the step S414), the system controller circuit 1031 conducts the seeking to just in front of the position where the light emission for recording is stopped in the step 413, and then conducts the following operation thereafter (step S415). Herein, the position where the light emission for recording is stopped means the terminal end of the cluster memorized in the step S411. Also, the system controller circuit 1031 indicates the recoding signal processor circuit 1041 to start the recording from the position where the light emission for recording is stopped (but omitted in the flowchart).

Following to the above, the recoding signal processor circuit 1041 determines if the position reaches to the position where the light emission for recording is stopped or not, from the address information, which can be obtained from the reproduce signal processor circuit 1036 (step S416). If not reaching to the position where the light emission for recording is stopped (in case of "No" in the step S416), it turns back to the step S416. Thus, it is in the operation of waiting until when the position reaches to the position where the light emission for recording is stopped.

When the position reaches to the position where the light emission for recording is stopped (in case of "Yes" in the step S416), the process turns back to the step S405 to start the light emission for recording.

Following to the above, explanation will be given on an effect of the present embodiment, by referring to FIGS. 5A to 5D. The present embodiment has an effect when the lens shifting occurs larger than that estimated, and that may occur when an external vibration is applied on the pickup, for example. For that reason, the explanation will be given on the case where the external vibration is applied thereon. Also, it is assumed that the pickup 102 according to the present embodiment has a view field characteristic shown in FIGS. 10A and 10B.

Figure 5:
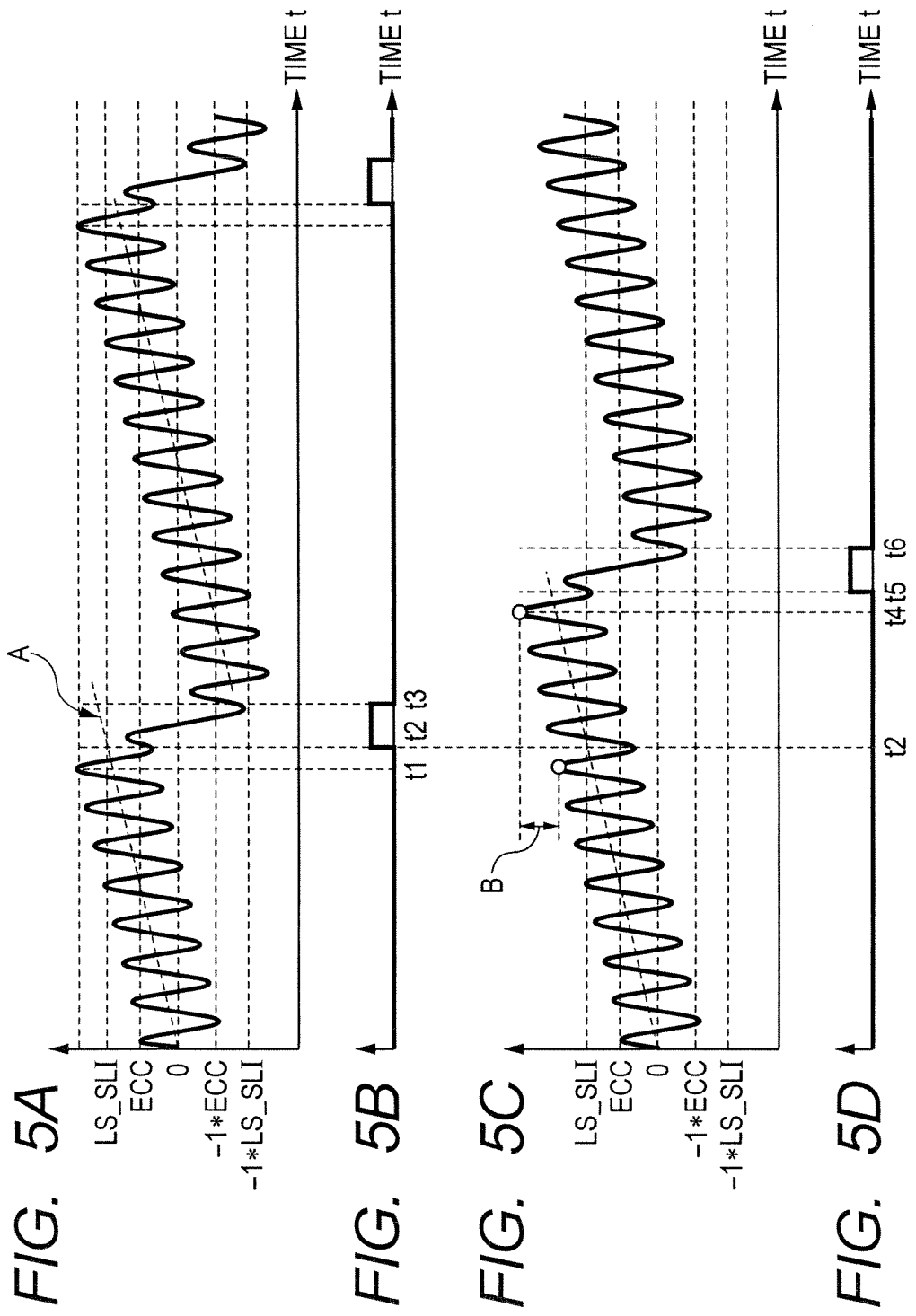
FIGS. 5A to 5D are views for showing signal waveforms for explaining an effect of the embodiment 1.

FIGS. 5A to 5D are the waveform views for explaining an amount of the lens shifting during the recording operation. FIG. 5A shows the amount of the lens shifting, wherein an axis therein is positive in the direction of the outer periphery. Also, FIG. 5B shows timing for driving the slider, wherein the slider is driven during the time-period of the "High level". Also, it is assumed that the optical disc 101 has a predetermined amount of eccentricity, and the amount is presented by "ECC". Further, with the addresses on the recording surface of the optical disc 101, the explanation will be made with using a case where the address increases up, directing from the inner periphery to the outer periphery, like a L0 layer of the Blu-ray Disc, for example.

However, in the present embodiment, since the slider controller circuit 1037 outputs a slider drive signal therefrom, upon basis of an averaged value of the output signals of the tracking controller circuit 1033, it can be consider that the signal shown in FIG. 5B is a signal produced inside the slider controller circuit 1037. For example, when applying a stepping motor as the slider motor 110, a step is renewed during the time-period when this signal is "High".

FIGS. 5A and 5B show the case where no external vibration is applied, and the explanation will be given by referring to those figures.

When in the operation of following the track, since the pickup continues to follow a predetermined track, the signal waveform of the objective lens has a sinusoidal waveform of amplitude ECC. Further, since the address on the recording surface of the optical disc 101 increases up directing from the inner periphery to the outer periphery, the amount of the lens shifting shifts, gradually, to the direction of the outer periphery, i.e., into the positive direction.

The time-period from the time t2 to the time t3, during which the slider drive signal is outputted, and as a result that the slider is driven, the objective lens 1027 continuing to follow the track moves in the direction of the outer periphery, with respect to the pickup 102, on which the photo detector 1029 is mounted; i.e., the amount of lens shifting is changed into a negative value. After the time t3, since the slider drive is stopped, the amount of lens shifting shifts into the positive direction, again.

A broken line indicated by "A" in FIG. 5A shows a component due to the fact that the track on the recording surface of the disc 101 has the spiral structure directing from the inner periphery to the outer periphery, and this can be considered as the amount of lens shifting when the amount of eccentricity is zero (0). "LS_LSI" in FIG. 5A is the amount of lens shifting at a point where this straight line comes across a straight line at the time t2.

This "LS_LSI" is the amount of lens shifting, which is estimated when the slider drive is designed. Thus, the slider controller circuit 1037 produces a signal, corresponding to the broken line indicated by "A" in FIG. 5A upon the averaged value of the output signals of the tracking controller circuit 1033, and detects that the objective lens shifts by the predetermined amount of lens shifting, and then drives the slider into the direction of the outer periphery. In this instance, it is preferable that the amount of driving the slider is "2×LS_LSI".

With designing a system of the slider drive in this manner, the slider is driven at a stage where the lens shifting when averaging the components of eccentricity comes to "LS_LSI" in the direction of the outer periphery, and the operation of following the track starts from the condition of being "LS_LSI" in the direction of the outer periphery. For this reason, the optical pickup 102 is shifted in the radial direction of the disc even if it continues to follow the track, so that it operates with the amount of lens shifting equal to less than "LS_LSI" centering around the position where the lens shifting of the objective lens 1027 is zero (0).

However, as can be seen from FIGS. 5A and 5B, it is the time t1 when the lens shifting comes up to the maximum, and the amount of the lens shifting at that time is nearly coincident with "LS_LSI+ECC". However, since the time t1 when the eccentricity comes up to the maximum does not coincide with the time t2 when starting the slider drive, completely, then it does not coincide with "LS_LSI+ECC", completely.

On the other hand, FIG. 5B shows the waveform, which can occurs when the external vibration is applied. Due to the fact that the external vibration is applied, the averaged value of the output signals of the tracking controller circuit 1033 may be shifted into any one of the positive or negative directions. Also, the shift of this direction may be changed depending on the direction, into which the external vibration is applied.

When the averaged value of the output signals of the tracking controller circuit 1033 shifts into either one of the positive or the negative ones due to the external vibration, the slider controller circuit 1037 drives the slider at an erroneous timing.

FIG. 5B shows the case where the averaged value of the output signals of the tracking controller circuit 1033 comes to the output similar to when the lens shifting occurs into the inner periphery side, and the timing of driving the slider is delayed. In this instance, at the time t5 later than the time t2, driving of the slider starts. As a result of this, in FIG. 5B, the lens shifting comes up to the maximum at the time t4, and the amount of the lens shifting at this time is larger than "LS_LSI+ECC" (see an arrow B in FIG. 5B).

Figures 13A, 13B:
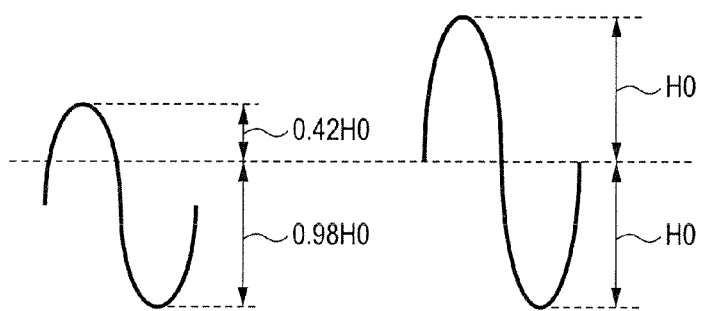
FIGS. 13A and 13B are views of signal waveforms of the tracking error signal when the lens shifting occurs.
Figure 14A:
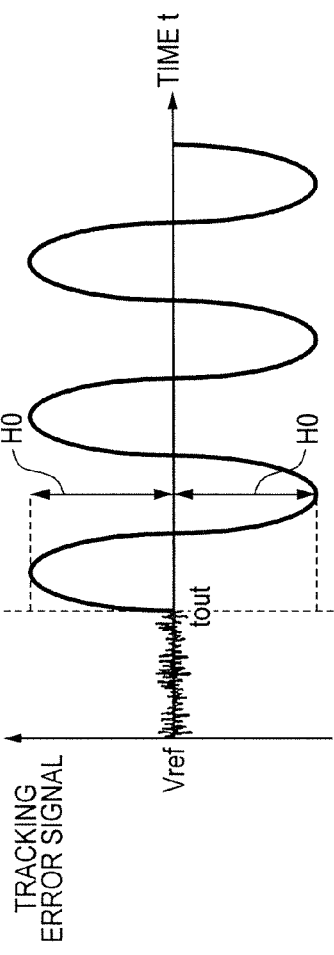
FIGS. 14A to 14C are views of signal waveforms for explaining when tracking out occurs when the lens shifting occurs.
Figure 14B:
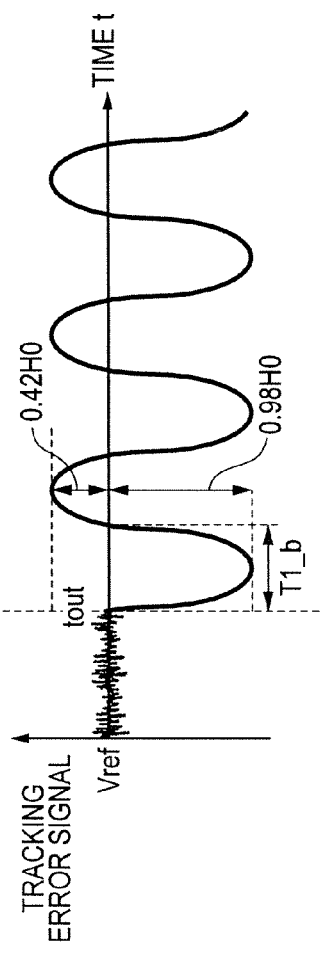
Figure 14C:
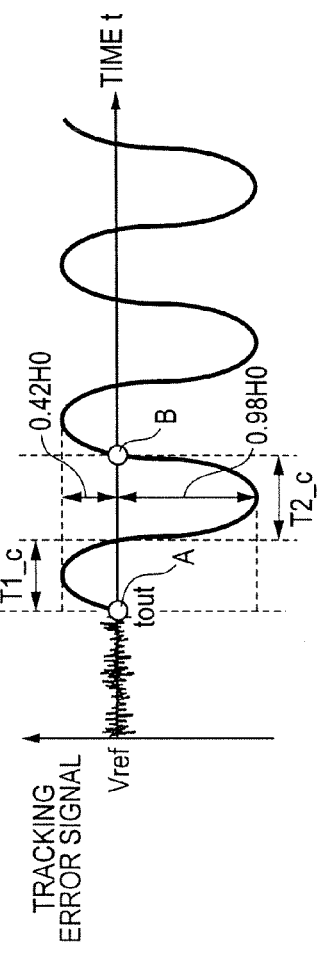

Thus, in such case as shown in FIG. 5B, the lens shifting occurs, the amount of which is larger than that estimated when designing the slider drive system. For example, if the amount of lens shifting is 300 μm at the time t5, then as is shown in FIGS. 13A and 13B, the upper-side amplitude thereof is 42% while the lower-side amplitude is 98% (assuming that the one-side amplitude when the lens shifting is zero (0) is 100%). For that reason, if the tracking out occurs at time t5, then as is explained in FIGS. 14A to 14C, it is impossible to detect the tracking out, normally.

In the present embodiment is provided the lens shifting amount determine circuit 202. The lens shifting amount determine circuit 202 turns the LSNG signal into "High" upon the fact that an absolute value of change of the LE signal exceeds the predetermined threshold value "Vth_LE", and as a result thereof, the light emission for recording is stopped. Hereinafter, explanation will be given on the predetermined threshold value "Vth_LE".

Figure 6:
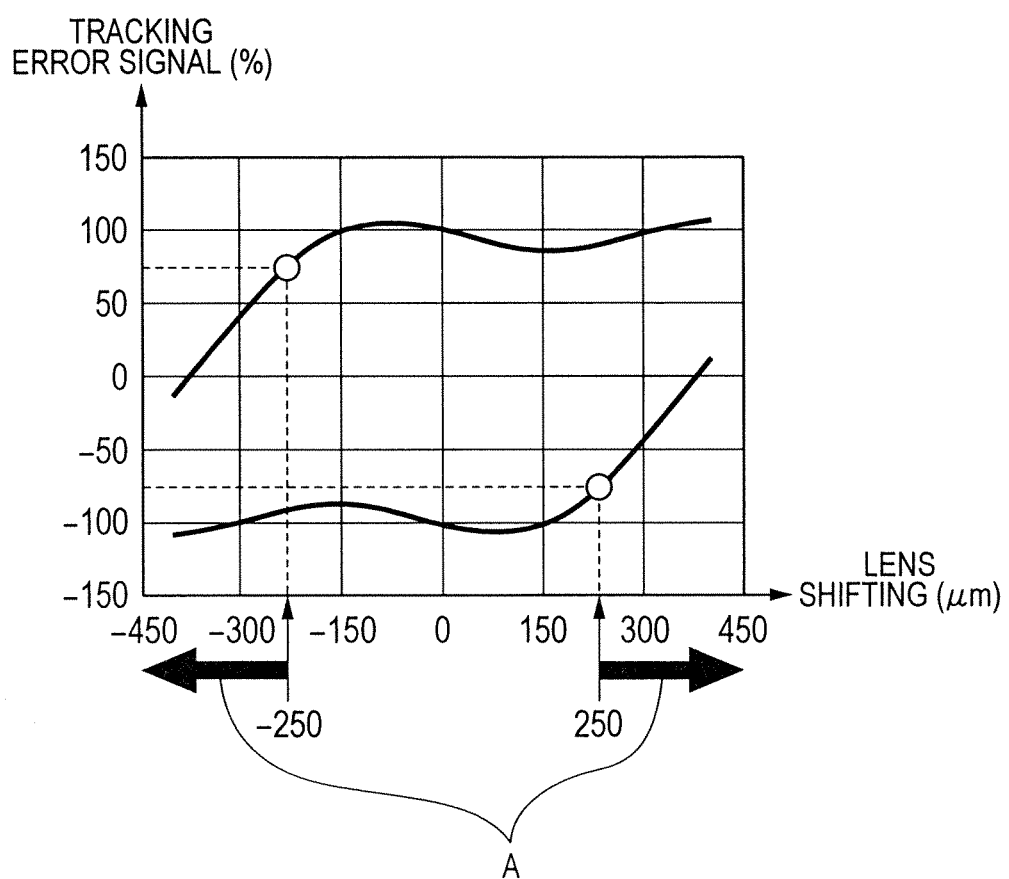
FIG. 6 is a characteristic diagram for showing an envelope of a TE signal when the lens shifting occurs.
Figure 10A:
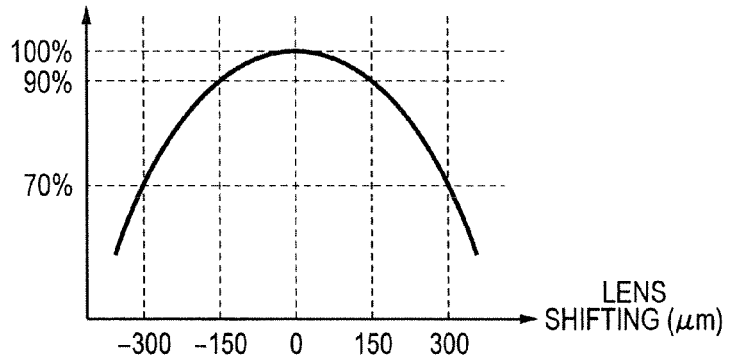
FIGS. 10A and 10B are views for explaining the view field characteristics.
Figure 10B:
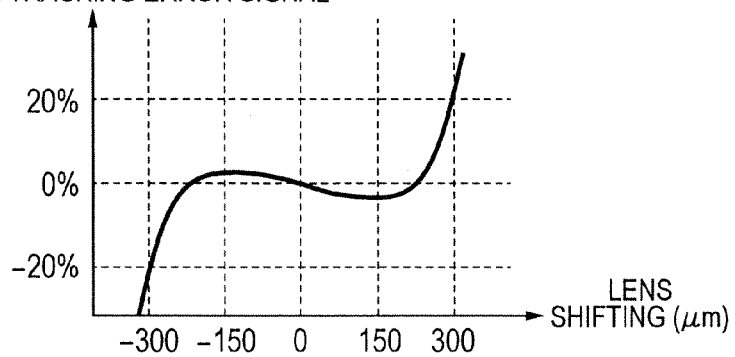
Figure 11A:
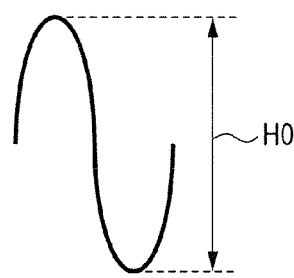
FIGS. 11A to 11C are views of signal waveforms for explaining the definitions of amplitude and a balance of a tracking error signal.
Figure 11B:
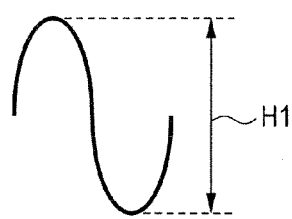
Figure 11C:
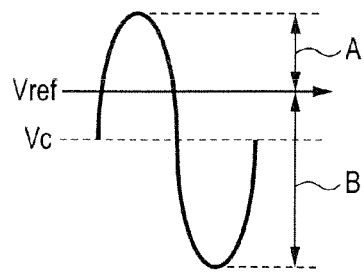
Figure 12A:
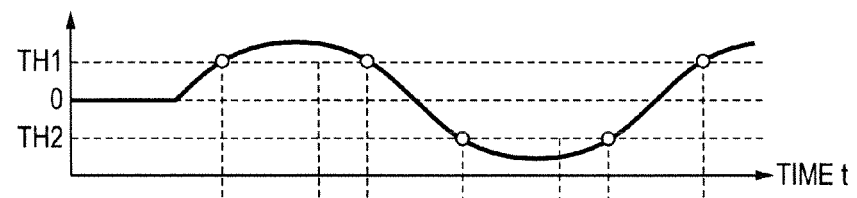
FIGS. 12A to 12D are views of signal waveforms for explaining the operation of a tracking out detecting method.
Figure 12B:
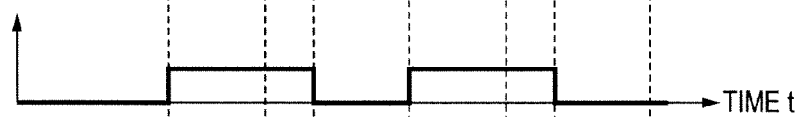
Figure 12C:
Figure 12D:

FIG. 6 shows how an up-down envelope of the TE signal changes depending on the lens shifting, upon basis of data of the view field characteristics shown in FIGS. 10A and 10B mentioned above. As was mentioned previously, under the condition that the amount of lens shifting is −300 μm, the upper-side amplitude is 42% while the lower-side amplitude is 98%.

In FIG. 6, a region shown by "A" therein, i.e., the region where the absolute value of the amount of lens shifting is equal to or greater than 250 μm, the upper-side amplitude of the TE signal or the lower-side amplitude of the TE signal is equal to or less than 75%, and therefore it is difficult to detect the normal tracking out.

Then, in the lens shifting amount determine circuit 202 according to the present embodiment, it is assumed that the threshold value "Vth_LE" is a potential corresponding to the case where the absolute value of the amount of lens shifting is 250 μm, and upon the fact that the absolute value of the amount of lens shifting exceeds 250 μm, determination is made that the amount of lens shifting is large and the LSNG signal is turned into "High".

For that reason, when the lens shifting exceeds 250 μm during the recording, the recording operation is stopped by, not the tracking out detector circuit, but the lens shifting amount determine circuit 202. With this, the recording operation is stopped, when the lens shifting occurs, being larger than that, which is estimated when designing the slider drive system, and thereby the tracking out occurs, i.e., under the condition that the tracking out cannot be detected, normally.

In this manner, according to the present embodiment, when such a large lens shifting occurs, that the tracking out detector circuit cannot detect it, normally, since the recording operation is stopped by the lens shifting amount determine circuit 202, it is possible to escape from the condition of being unable to detect the tracking out during the recording.

Further, since the recording operation is started, again, after the lens shifting comes down to be small, it is possible to escape from the recording operation under the condition, i.e., such a large lens shifting occurs that the tracking out cannot be detected.

Also, the present embodiment is characterized that the recording operation is stopped depending upon the amount of lens shifting, before the tracking out actually occurs.

Figure 4:
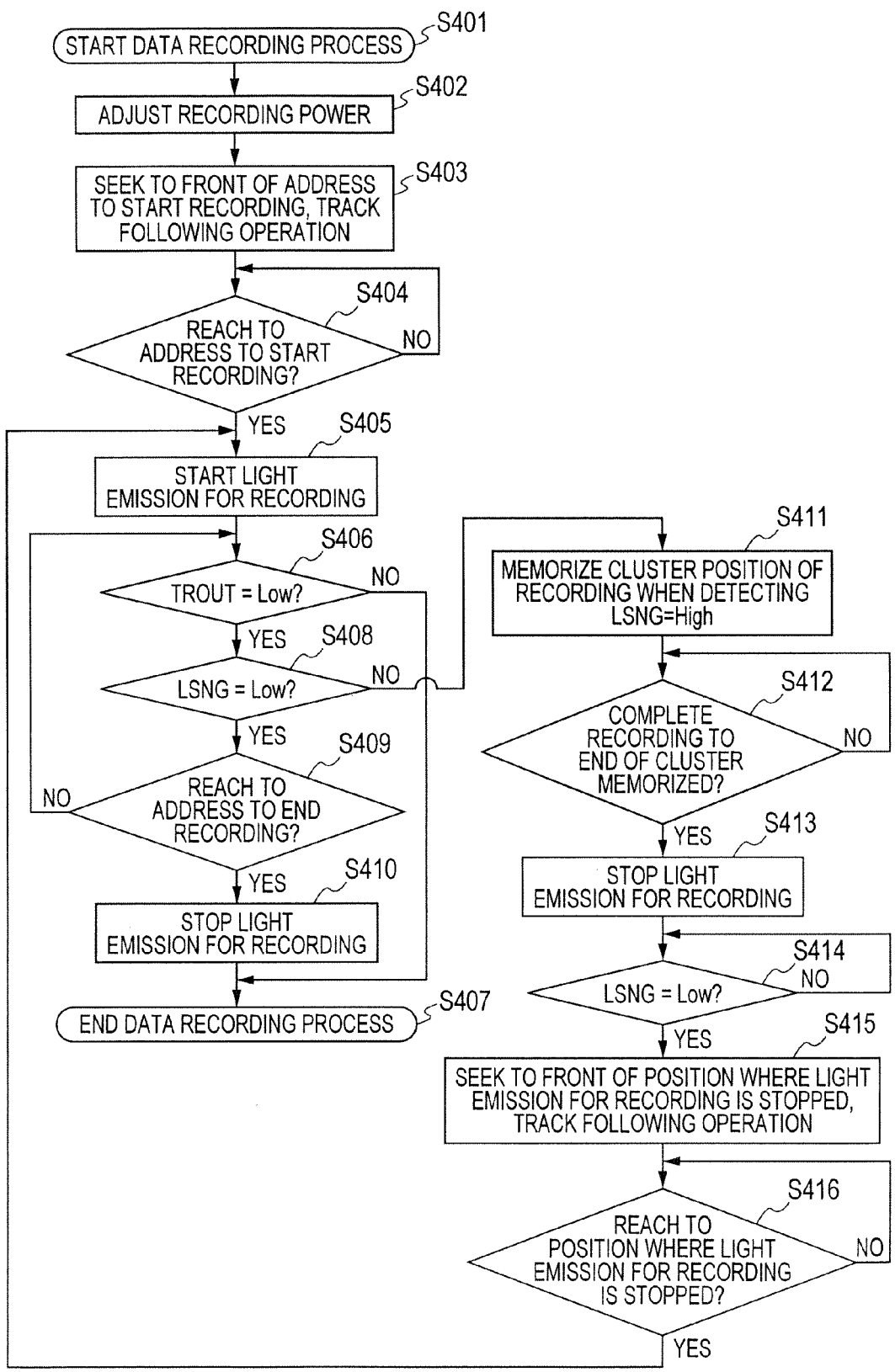
FIG. 4 is a flowchart for showing a data recording process in the embodiment 1.

However, in the flowchart shown in FIG. 4, the system controller circuit 1031 is constructed to observe the level of the LSNG signal, especially, in the step S408 or the step S414. However, the system controller circuit 1031 may operate, for example, dividing the process when receiving an interruption, while entering the interruption upon the LSNG signal.

In FIG. 5B, the explanation was made on the case where the average value of the output signals of the tracking controller circuit 1033 comes to the output similar to that when the lens shifts to the inner periphery side; however, there will also occur the similar problem, where the average value of the output signals of the tracking controller circuit 1033 comes to the output similar to that when the lens shifts to the outer periphery side. Thus, when the average value of the output signals of the tracking controller circuit 1033 comes to the output similar to that when the lens shifts to the outer periphery side, the slider controller circuit 1037 determines that the objective lens lies in the outer periphery side than an actual position thereof, and this results into that it drives the slider at early timing. If the timing of driving the slider is early, on the inner periphery side occurs the lens shifting larger than −1* (LS_LSI+ECC). For that reason, there occurs the amount of lens shifting larger than that estimated when designing the slider drive system; and this also brings about the similar problem. For this reason, it is preferable that the lens shifting amount determine circuit 202 makes comparison on the absolute value of change of the LE signal with the predetermined threshold value "Vth_LE".

Also, although the explanation was given on the case where the lens shifting occurs, being equal to or greater than the estimation, due to addition of the external vibration, for example; however it is apparent that the present embodiment has that effect even when the lens shifting occurs, being equal to or greater than the estimation, due to a factor(s) other than the external vibration.

With such the operation as was mentioned above, for the optical disc apparatus according to the embodiment 1 can improve the reliability of the optical disc apparatus.

Embodiment 2

Explanation will be given on an embodiment 2, hereinafter. For the purpose of explanation, it is assumed that the optical disc 101 is the Blu-ray Disc and the unit of the minimum recording is 1 cluster.

Figure 7:
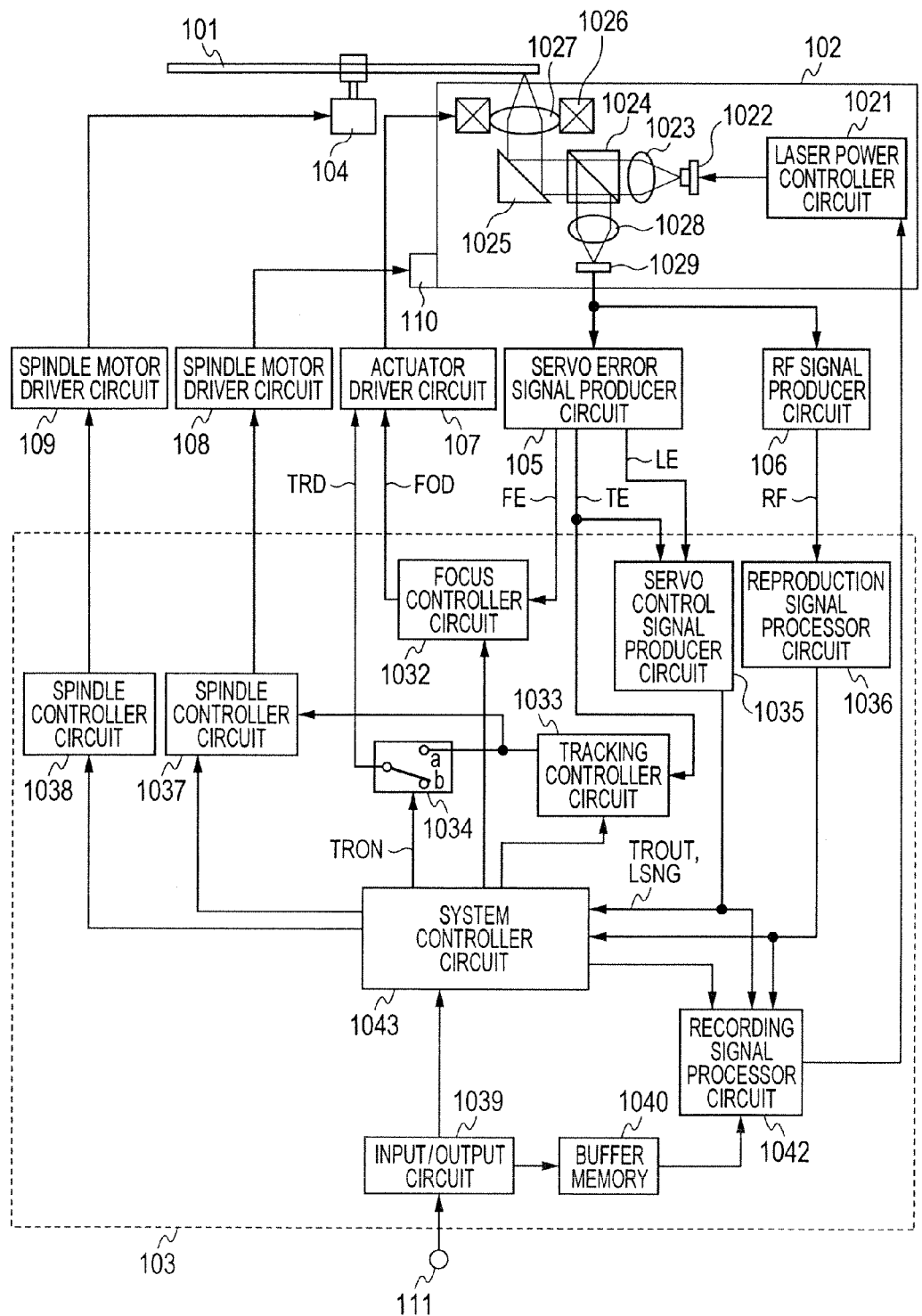
FIG. 7 is a block diagram for showing the structure of an optical disc apparatus according to an embodiment 2 of the present invention.

FIG. 7 is a block diagram for showing the structures of the optical disc apparatus according to the present embodiment. However, with the constituent elements thereof, being common with those shown in FIG. 1, i.e., the block diagram of the embodiment 1, they are attached with the same reference numerals, so that the explanations thereof will be omitted herein.

The structure of the servo control signal producer circuit 1035 is common with that of the embodiment 1, i.e., producing the tracking out detection signal TROUT and the LSNG signal, to output them therefrom. In the present embodiment, the TROUT signal is inputted into a system controller circuit 1043, and the LSNG signal is inputted into the system controller circuit 1043 and a recording signal processor circuit 1042.

The recording signal processor circuit 1042 in the present embodiment reads out a predetermined amount or volume of data from the buffer memory 1040 when recoding the data, so as to produce the recording signal by conducting an addition of error correction code, an encoding process, a modulation process, etc., thereon, and outputs it after converting into a laser light emitting pulse train.

The signal outputted from the recording signal processor circuit 1042 is inputted into the laser power controller circuit 1021, so that the laser light source 1022 emits the light for recording. In that instance, the recording signal processor circuit 1042 controls the light for recording to be emitted, in synchronism with the position where the recording should be made, so that the data is recorded, upon basis of the information, which is inputted from the reproduce signal processor circuit 1036.

Further, the recording signal processor circuit 1042 has such structure that an interruption enters therein, upon the TROUT signal. When the interruption upon the TROUT signal enters therein, it sends out a signal to the laser power controller circuit 1021, instantaneously, so as to stop the light emission at the recording power, and to change it into the light emission at the reproducing power.

The recording signal processor circuit 1042 has such structure that an interruption enters therein, even upon the LSNG signal. Hereinafter, explanation will be given on an operation of the recording signal processor circuit 1042 when the interruption enters upon the LSNG signal.

When the interruption enters therein due to the LSNG signal, the recording signal processor circuit 1042 sends out a signal to the laser power controller circuit 1021, so as to stop the light emission at the recording power, as well as, stopping the processes, such as, the addition of the error correction code, the encoding process, the modulation process, etc., instantaneously, without waiting a boundary of the cluster, and changes the light emission to that at the reproducing power. In this instance, the recording signal processor circuit 1042 memorizes the position where the recording is stopped when the interruption enters due to the LSNG signal.

Then, when being indicated to re-start the recording by an indication signal from the system controller circuit 1043, it sends out a signal to the laser power controller circuit 1021 to change the light emission from the reproducing power to the recording power, thereby re-staring the light emission for recording, as well as, re-staring the processes, such as, adding of the error correction code, the encoding process, the modulation process, etc., which are interrupted, on the way of the cluster. In that instance, the recording signal processor circuit 1042 starts the light emission for recording in synchronism with the position where the recording should be re-started, upon basis of the information inputted from the reproduce signal processor circuit 1036; thereby a control for re-starting the recording of data.

The information obtained by the recording signal processor circuit 1042 from the reproduce signal processor circuit 1036, in the present embodiment, is information having length shorter than that of the cluster; for example, corresponding to PSN (Physical Sector Number), a frame number shorter than one (1) address of PSN, etc.

Also, the recording signal processor circuit 1042, when the data is reproduces, outputs an instruction signal to the laser power controller circuit 1021, thereby to do the light emission at the reproducing power, upon basis of the indication signal from the system controller circuit 1043.

As the indication signal from the system controller circuit 1043 to the recording signal processor circuit 1042, in the present embodiment, may be re-starting of recording, etc., in addition to the starting of light emission for reproducing and/or the stopping of light emission for reproducing, the starting of light emission for recording and/or the stopping of light emission for recording, and the indication of adjustment of light emission power for recording.

Figure 8:
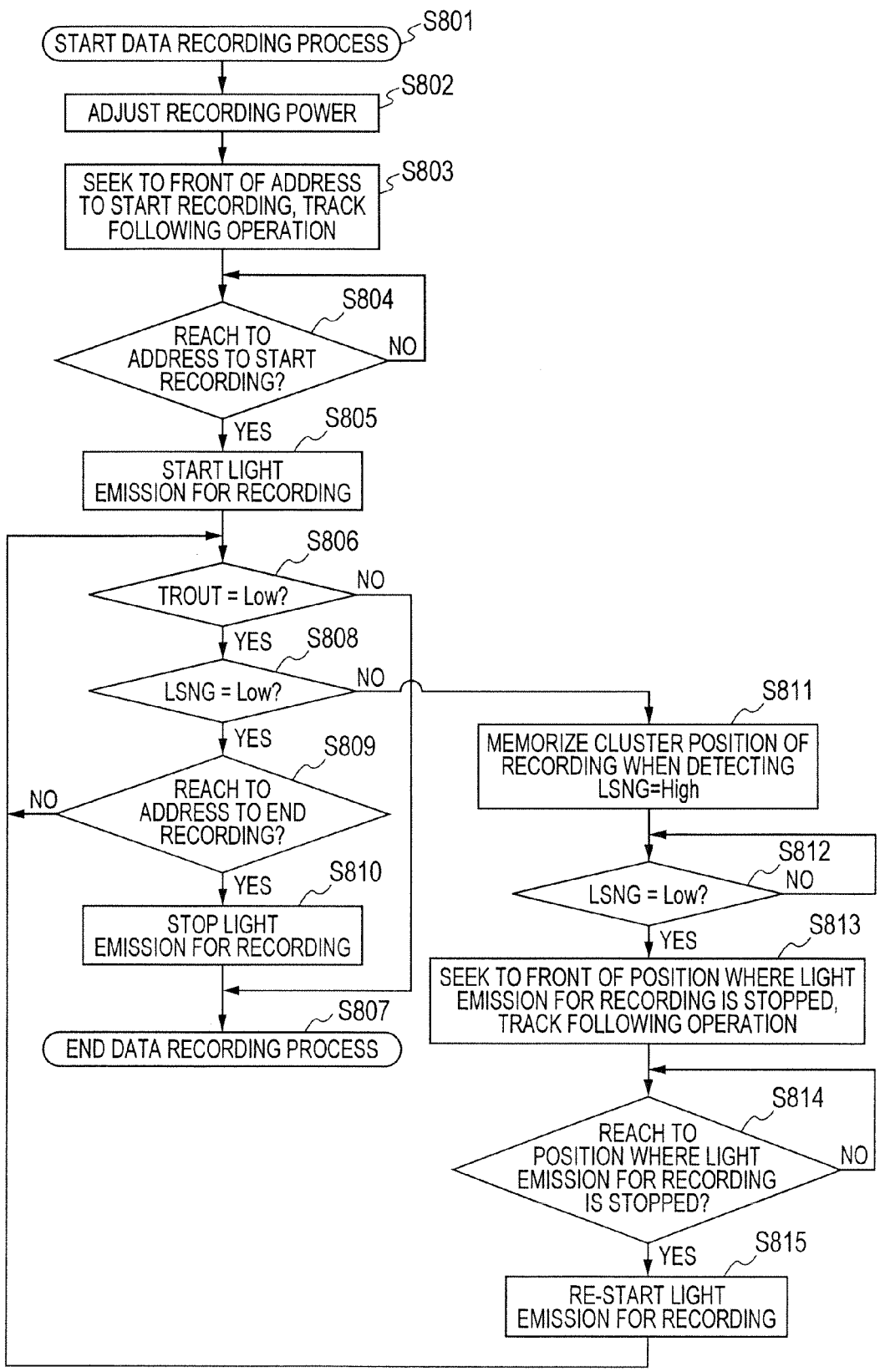
FIG. 8 is a flowchart for showing a data recording process in the embodiment 2.

Next, explanation will be given on the recording process in the present embodiment, by referring to the flowchart shown in FIG. 8.

When the optical disc apparatus starts a process for recoding data upon receipt of a command from the host apparatus (step S801), the system controller circuit 1043 sends out an indication to the recording signal processor circuit 1042, so as to make an adjustment of recording power (step S802). This adjustment of recording power is called "OPC".

When the adjustment of recording power is completed, the system controller circuit 1043 conducts seeking to just in front of the address to start the recording, and following to that it conducts a track following operation (step S803). The track following operation is an operation of continuing to follow the track, for example, after completing the seeking. Since the track on the recording surface of the optical disc has the spiral structure direction from the inner periphery to the outer periphery, the address following thereto changes if continuing the operation of continuing to follow the track. Also, the system controller circuit 1043 sends out an indication to start the recording to the recording signal processor circuit 1042 (but, this is omitted in the flowchart).

Following to the above, the recording signal processor circuit 1042 determines if the address reaches to that to start the recording or not (step S804), from the address information obtained from the reproduce signal processor circuit 1036. If not reaching to the address to start the recording (in case of "No" in the step S804), then the process turns back to the step S804. Thus, it is in the operation of waiting until when the address reaches to that to start the recording.

When the address reaches to that to start the recording (in case of "Yes" in the step S804), the recording signal processor circuit 1042 starts the light emission for recording, and thereby starts the recording of data (step S805).

After starting the recording operation, the system controller circuit 1043 determines if the level of the TROUT signal is "Low" or not (step S806).

When the level of the TROUT signal is "High" (in case of "No" in the step S806), the system controller circuit 1043 ends the process for recording data (step S807).

Herein, the fact that the level of the TROUT signal is "High" means that the tracking out detector circuit 201 detects the tracking out. In this instance, the interruption enters into the recording signal processor circuit 1042, and then the light emission for recording is stopped. For that reason, it is in the to operation of reporting a failure of recording to the host apparatus and ending the process for recording data.

When the level of the TROUT signal is "Low" (in case of "Yes" in the step S809), the system controller circuit 1043 determines if the level of the LSNG signal is "Low" or not (step S808).

When the level of the LSNG signal is "Low" (in case of "Yes" in the step S810), the system controller circuit 1043 determines if the address reaches to that to end recording or not (step S809).

When the address reaches to that to end recording (in case of "Yes" in the step S809), the system controller circuit 1043 sends out an indication to the recording signal processor circuit 1042, so as to stop the light emission for recording (step S814). Thus, the light emission at the recording power is stepped and is changed into the light emission at the reproducing power.

On the other hand, if not reaching to the address to end the recording (in case of "No" in the step S809), then the process turns back to the step S806, and continues the operation for recording data. For that reason, in case where both the TROUT signal and the LSNG signal are always at the "Low level", the recording of data is continued from the address to start recording until the address to stop recording, i.e., the normal operation for recording data of the optical disc apparatus.

When the LSNG signal is "High" (in case of "No" in the step S808), the system controller circuit 1043 memorizes the address, which is recorded when detecting the LSNG signal is "High" (step S811).

Herein, the fact that the level of the LSNG signal is "High" means that the lens shifting amount determine circuit 202 determines that the lens shifting is large. In this instance, in the present embodiment, the interruption enters into the recording signal processor circuit 1042, and therefore the light emission for recording is interrupted.

After the step S811, the system controller circuit 1043 determines if the level of the LSNG signal is "Low" or not (step S812). When the level of the LSNG signal is "High" (in case of "No" in the step S812), the process turns back to the step S812, so as to wait until when the level of the LSNG signal turns into "Low".

When the level of the LSNG signal is "Low" (in case of "Yes" in the step S812), the system controller circuit 1043 does the seeking to just in front of the position where the light emission for recording is stopped, and following to that, it conducts the operation of following the track (step S813). Also, the system controller circuit 1043 indicates the recording signal processor circuit 1042 to re-star the recording from the position where the light emission for recording is stopped (but, this is omitted in the flowchart).

Herein, the position where the light emission for recording is stopped is a position before or in front of the address, which is memorized in the step S811. Since the cycle for the system controller circuit 1043 to observe the LSNG signal is determined, in the step S811, it is possible to calculate out, how much in front of should be made the seeking, with respect to the address that is memorized in the step S811, so as to position the light emission for recording in front of the position where it is actually stepped.

Following to the above, the recording signal processor circuit 1042 determines if the position reaches to where the light emission for recording is stopped or not (step S814), from the address information obtained from the reproduce signal processor circuit 1036. When it does not reaches to the position where the light emission for recording is stopped (in case of "No" in the step S814), the process turns back to the step S814. Thus, it is in the operation of waiting until when the position reaches to where the light emission for recording is stopped.

When the position reaches to where the light emission for recording is stopped (in case of "Yes" in the step S814), the recording signal processor circuit re-starts the light emission for recording (step S815), and turns back to the step S806.

Herein, the re-starting of the light emission for recording, which is conducted by the recording signal processor circuit 1042 means to start the light emission for recording in synchronism with the position where the recording should be re-started, even if the position where the light emission for recording should be re-started in on the way of the cluster, as was mentioned above. Further, with the addition of the error correct code, the encoding process, the modulation process, etc., they will be re-started from, on the way of the cluster.

Following to the above, explanation will be given on an effect(s) of the present embodiment, by referring to FIGS. 9A to 9G.

FIGS. 9A to 9G show waveforms when the tracking out occurs, because of an impact of large acceleration applied in short time-period as the external vibration.

FIG. 9A shows an amount of lens sifting. ECC is an amount of eccentricity owned by the optical disc 101, and "LS_SLI" is an amount of lens shifting, which is estimated when designing the slider drive. Also, "LSth" shows an amount of lens shifting, to be used as the threshold value when the lens shifting amount determine circuit 202 determines large or small of the amount of the lens shifting. The "LSth" can be said, in other words, to be an amount of lens shifting corresponding to the threshold value so "Vth_LE" for the LE signal in the lens shifting amount determine circuit 202.

Also, FIG. 9B shows the period during when the impact is applied, diagrammatically, wherein the period of "High level" means that the impact applied on the optical disc apparatus.

As can be seen from FIGS. 9A to 9G, due to the impact applied from the time tsh, the amount of lens shifting shown in FIG. 9A increases. Herein, the slider controller circuit 1037 is so constructed that it outputs the slider drive signal upon basis of the average level of the outputs of the tracking controller circuit 1033. For that reason, the slider will not be driven, immediately, even if the lens shifting comes to be large temporarily. For that reason, such a large lens shifting may occur, as is shown in FIGS. 9A to 9G, when the impact is applied.

FIG. 9C shows a signal for indicating a boundary of the cluster, which jumps up to be "High", instantaneously, on the boarder of the cluster. FIG. 9D shows the LSNG signal, and FIGS. 9E and 9F show signals for indicating the time, during which the light for recording is emitted, diagrammatically, and those signals will be called "WR" signals for the purpose of the explanation. The "WR" signal indicates that the light for recording is emitting, during the time-period when it is "High level".

FIG. 9E shows the "WR" signal within the structure of the embodiment 1, and FIG. 9F the "WR" signal within the present embodiment. Also, FIG. 9S shows the "TE" signal, being the "TE" signal.

The time "t1" is the time when the amount of lens shifting shown in FIG. 9A, continuing to increase due to the impact beginning to be applied from the time "tsh", is determined to be large by the lens shifting amount determine circuit 202. Also, the time "t2" is the time when the pickup passes through the boundary of the cluster, at first later than the time "t1".

The time "tout" is the time when the tracking out occurred, and herein is shown the case where the time "tout" is later than the time "t1" and earlier than the time "t2".

In the embodiment 1, the light emission for recording is stopped fitting to the boundary of the cluster, being passed through firstly after the "LSNG" signal comes to be "High". For that reason, the "WR" signal comes down to be "Low" in the waveform thereof, as is shown in FIG. 9E.

Herein, when the large impact is applied, a large acceleration is given to the objective lens and this brings about a large lens shifting thereof, instantaneously. For that reason, during the time-period from the time "t1" when the lens shifting amount determine circuit 202 determines the amount of lens shifting is large up to the time "t2" when the light emission for recording is stopped actually, as is shown by an arrow "A" in FIG. 9A, the lens shifting becomes large.

When the magnitude of the impact is large, during the time-period from the time "t1" to the time "t2", there is a possibility that the tracking out occurs. For that reason, as is shown in FIG. 9G. Since the time "tout" is later than the time "t1" and earlier than the time "t2", in the embodiment 1, the tracking out occurs during the light emission for recording.

Further, in the embodiment 1, the threshold value "LSth" to be used by the lens shifting amount determine circuit 202, for determining the amount of lens shifting to be large or small, is determined to be such an amount of lens shifting that the normal detection of the lens shifting becomes difficult. For that reason, at the time "t2", since it is the tracking out, occurring under the condition where there is the lens shifting equal to or greater than "LSth", then the amplitude of either on the upper-side or the lower-side is small, as is shown in FIG. 9G, and it is impossible to detect the tracking out, normally.

On the other hand, in the present embodiment, in an instance when the "LSNG" signal turns into "High", the light emission for recording is stopped by the interruption, instantaneously. For that reason, the "WR" signal has the waveform being "Low" at the time "t1", as is shown in FIG. 9F.

If assuming that there is no difference between the TE signal at the reproducing power and the TE signal at the recording power, then the waveform of the TE signal shown in FIG. 9O is also common in the present embodiment. However, the difference from the embodiment 1 lies in that the tracking out occurs after stopping the light emission for recording.

For that reason, according to the present embodiment, the pickup can escape from coming across the neighboring track while keeping the condition of emitting the light for recording even when the impact is applied, and then the data already recorded can be escaped from being broken or damaged.

Also, as is apparent from FIGS. 9A to 9G, according to the present embodiment, there is a characteristic that the light emission for recording is stopped, instantaneously, depending on the amount of lens shifting before the tracking out occurs, actually.

However, in FIGS. 9A to 9G, the explanation was given that the time "tout" when the tracking out occurs is later than the time "t1" and earlier than the time "t2". When the tracking out occurs earlier than the time "t1", since this means that the tracking comes out under the condition that the amount of lens shifting is equal to or less than "LSth", then it is possible to detect the tracking out, normally, and in the similar manner, no damage occurs on the data already recorded.

From this reason, it is possible to escape the data recorded on the neighboring track, even with using the optical pickup having the view field characteristics being largely deteriorated, by stopping the recording operation with applying both outputs of the tracking out detector circuit 201 and the lens shifting amount determine circuit 202 in common.

With such operation mentioned above, the optical disc apparatus according to the embodiment 2 can improve the reliability of the optical disc apparatus.

In the embodiment mentioned above is applied such structure that the lens shifting is determined to be large or small upon basis of the "LSNG" single, which is produced from the "LE" signal. However, the method for detecting the amount of lens shifting should not be limited only to this. For example, with providing a sensor for measuring the shift of the objective lens within the pickup, the amount of lens shifting may be detected, not depending on the reflection light from the optical disc.

In the embodiment mentioned above, the explanation was given on the case where the address on the recording surface of the optical disc 101 increases up directing from the inner periphery towards the outer periphery; however, the present invention can be applied, in the similar manner, into the case where the address on the recording surface increases up directing from the outer periphery towards the inner periphery, such as, on a L1 layer of a two-layer disc of Blu-ray Disc, for example.

In the embodiments mentioned above, the explanation was given with assumption that the optical disc 101 is the Blu-ray Disc, and that the minimum recording unit is one (1) cluster. However, the optical disc 101 may be an optical disc regulated by the regulation other than that for the Blu-ray Disc. In that case, it is sufficient to replace the description, explaining that the minimum recording unit is one (1) cluster, in the present specification, by a name fitting to that regulation.

Further, the present invention should not be limited to the embodiments mentioned above, but various variations may be included therein. For example, the embodiments mentioned above were explained for the purpose of easy understanding of the present invention, there is no necessity of limiting to that having all the constituent elements explained. Also, a part of a constituent elements of a certain embodiment can be replaced a constituent element of the other embodiment, and also it is possible to add an constituent element of a certain embodiment to the constituent element of other embodiment. And also, regarding a part of the constituent element of each embodiment, it is possible to add, delete, and/or replace the other constituent element thereto.

Also, a part or all of each constituent element may be constructed with hardware, or may be so constructed that it can be achieved by executing program by a processor. Also, the control lines or information lines are shown, as far as they are necessary for the explanation, but it is not necessarily true that there are shown all the control lines and the information lines necessary for the production. In actual, it can be considered that almost of all of the constituent elements are connected with one another.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disc apparatus for recording or reproducing information by irradiating a laser beam on an optical disc, comprising:
   an optical disc rotating portion configured to rotate said optical disc centering around a predetermined rotation axis;
   a light emission power changing portion configured to change a light emission power of said laser beam;
   an objective lens configured to focus the light spot of said laser beam on said optical disc;
   an actuator configured to drive said objective lens;
   a photo detector portion configured to output an electric signal depending on an amount of reflection light from said optical disc;
   a focus error signal producing portion configured to produce a focus error signal from the output signal of said photo detector portion;
   a tracking error signal producing portion configured to produce a tracking error signal from the output of said photo detector portion;
   a focus controlling portion configured to conduct focus control upon the basis of said focus error signal;
   a tracking controlling portion configured to conduct tracking control upon the basis of said tracking error signal;
   a lens shifting detecting portion configured to detect lens shifting of said objective lens; and
   a minimum recording unit boundary detecting portion configured to detect a boundary of a minimum recording unit of said optical disc,
   wherein the light emission power of said laser beam is lowered from a recording power down to a reproducing power, in synchronism with the boundary of said minimum recording unit, thereby to stop recording of the information, in response to said lens shifting detecting portion detecting that lens shifting of said objective lens is larger than a predetermined amount during recording of the information on said optical disc.

2. An optical disc apparatus for recording or information irradiating a laser on an optical disc, comprising:
   an optical disc rotating portion configured to rotate said optical disc centering around a predetermined rotation axis;
   a light emission power changing portion configured to change a light emission power of said laser beam;
   an objective lens configured to focus the light spot of said laser beam on said optical disc;
   an actuator configured to drive said objective lens;
   a photo detector portion configured to output an electric signal depending on an amount of reflection light from said optical disc;
   a focus error signal producing portion configured to produce a focus error signal from the output signal of said photo detector portion;
   a tracking error signal producing portion configured to produce a tracking error signal from the output of said photo detector portion;
   a focus controlling portion configured to conduct focus control upon the basis of said focus error signal;
   a tracking controlling portion configured to conduct tracking control upon the basis of said tracking error signal; and
   a lens shifting detecting portion configured of said objective lens, wherein:
   said optical disc is regulated on a minimum recording unit thereof, and
   the light emission power of said laser beam is lowered from a recording power down to a reproducing power, at an accuracy finer than said minimum recording unit, thereby to stop recoding of the information, in response to said lens shifting detecting portion detecting that lens shifting of said objective lens is larger than a predetermined amount during recoding of the information on said optical disc.

3. An optical disc apparatus for recording or reproducing information by irradiating a laser beam on an optical disc, comprising:
   an optical disc rotating portion configured to rotate said optical disc centering around a predetermined rotation axis;
   a light emission power changing portion configured to change a light emission power of said laser beam;
   an objective lens configured to focus the light spot of said laser beam on said optical disc;
   an actuator configured to drive said objective lens;
   a photo detector portion configured to output an electric signal depending on an amount of reflection light from said optical disc;
   a focus error signal producing portion configured to produce a focus error signal from the output signal of said photo detector portion;
   a tracking error signal producing portion configured to produce a tracking error signal from the output of said photo detector portion;
   a focus controlling portion configured to conduct focus control upon the basis of said focus error signal;
   a tracking controlling portion configured to conduct tracking control upon the basis of said tracking error signal; and
   a lens shifting detecting portion configured to detect lens shifting of said objective lens,
   wherein the light emission power of said laser beam is lowered from a recording power down to a reproducing power, thereby to stop recording of the information, in response to said lens shifting detecting portion detecting that lens shifting of said objective lens is larger than a predetermined amount during recording of the information on said optical disc, and thereafter the light emission power of said laser beam is increased from the reproducing power up to the recording power, thereby to start the recording, in synchronism with a position where the light emission power is lowered down.

4. An optical disc apparatus for recording or reproducing information by irradiating a laser beam on an optical disc, comprising:

an optical disc rotating portion configured to rotate said optical disc centering around a predetermined rotation axis;

a light emission power changing portion configured to change a light emission power of said laser beam;

an objective lens configured to focus the light spot of said laser beam on said optical disc;

an actuator configured to drive said objective lens;

a photo detector portion configured to output an electric signal depending on an amount of reflection light from said optical disc;

a focus error signal producing portion configured to produce a focus error signal from the output signal of said photo detector portion;

a tracking error signal producing portion configured to produce a tracking error signal from the output of said photo detector portion;

a focus controlling portion configured to conduct focus control upon the basis of said focus error signal;

a tracking controlling portion configured to conduct tracking control upon the basis of said tracking error signal; and a lens shifting detecting portion configured to detect lens shifting of said objective lens, wherein the light emission power of said laser team is lowered from a recording power down to a reproducing power, thereby to stop recording of the information, in response to said lens shifting detecting portion detecting that lens shifting of said objective lens is larger than a predetermined amount during recording of the information on said optical disc, and after said lens shifting detecting portion detects the lens shifting of said objective lens is smaller than a predetermined amount, the light emission power of said laser beam is increased from the reproducing power up to the recording power, thereby to start the recording, in synchronism with a position where the light emission power is lowered down.

5. The optical disc apparatus, as claimed in claim 3, wherein said lens shifting detecting portion detects the lens shifting upon the basis of an output signal of said photo detector portion.

6. The optical disc apparatus, as claimed in claim 3, further comprising a tracking out detecting portion configured to detect that said tracking control cannot follow the track on said optical disc any more, wherein the light emission power of said laser beam is lowered from the recording power down to the reproducing power, thereby to stop recording of the information, also when it is detected that said tracking control has become difficult to follow the track on said optical disc any more, by said tracking out detecting portion.

7. The optical disc apparatus, as claimed in claim 3, wherein the light emission power of said laser beam is lowered from the recording power down to the reproducing power, thereby to stop recording of the information, depending on a detection result of said lens shifting detecting portion, before said tracking control becomes difficult to follow the track on said optical disc any more.

8. An optical disc apparatus for recording or reproducing information by irradiating a laser beam on an optical disc, comprising:

an optical disc rotating portion configure to rotate said optical disc centering around a predetermined rotation axis;

a light emission power changing portion configured to change a light emission power of said laser beam;

an objective lens configured to focus the light spot of said laser beam on said optical disc;

an actuator configured to drive said objective lens;

a photo detector portion configured to output an electric signal depending on an amount of reflection light from said optical disc;

a focus error signal producing portion configured to produce a focus error signal from the output signal of said photo detector portion;

a tracking error signal producing portion configured to produce a tracking error signal from the output of said photo detector portion;

a focus controlling portion configured to conduct focus control upon the basis of said focus error signal;

a tracking controlling portion configured to conduct tracking control upon the basis of said tracking error signal; and a lens shifting detecting portion configured to detect lens shifting of said objective lens, wherein the light emission power of said laser beam is lowered from a recording power down to a reproducing power, thereby to stop recording of the information, in response to said lens shifting detecting portion detecting that an absolute value of lens shifting of said objective lens is larger than around 250 μm during recording of the information on said optical disc.

* * * * *